US012312502B2

(12) United States Patent
Scheffel et al.

(10) Patent No.: US 12,312,502 B2
(45) Date of Patent: May 27, 2025

(54) ADHESIVE COMPOSITE AND METHOD OF FORMING AN ADHESIVE COMPOSITE

(71) Applicant: Saint-Gobain Performance Plastics Biolink GmbH, Waakirchen (DE)

(72) Inventors: Jan Scheffel, Bad Tölz (DE); Andreas Roth-Rosenkranz, Munich (DE)

(73) Assignee: Saint-Gobain Performance Plastics Biolink GmbH (DE)

( * ) Notice: Subject to any disclaimer, the term of this patent is extended or adjusted under 35 U.S.C. 154(b) by 0 days.

(21) Appl. No.: 18/303,214

(22) Filed: Apr. 19, 2023

(65) Prior Publication Data

US 2023/0250322 A1    Aug. 10, 2023

Related U.S. Application Data

(62) Division of application No. 16/419,127, filed on May 22, 2019, now Pat. No. 11,661,535.

(Continued)

(51) Int. Cl.
| | | |
|---|---|---|
| *C09J 133/08* | (2006.01) | |
| *B32B 27/08* | (2006.01) | |
| *C09J 11/06* | (2006.01) | |
| *B32B 7/12* | (2006.01) | |
| *B32B 7/14* | (2006.01) | |

(52) U.S. Cl.
CPC ............ *C09J 133/08* (2013.01); *B32B 27/08* (2013.01); *C09J 11/06* (2013.01); *B32B 7/12* (2013.01); *B32B 7/14* (2013.01); *B32B 2307/54* (2013.01); *B32B 2307/542* (2013.01); *B32B 2405/00* (2013.01); *C09J 2301/21* (2020.08); *C09J 2301/312* (2020.08); *C09J 2301/416* (2020.08)

(58) Field of Classification Search
None
See application file for complete search history.

(56) References Cited

U.S. PATENT DOCUMENTS

| | | | |
|---|---|---|---|
| 5,518,088 A | 5/1996 | Brosilow | |
| 5,842,686 A | 12/1998 | Hansen et al. | |

(Continued)

FOREIGN PATENT DOCUMENTS

| | | |
|---|---|---|
| DE | 19645030 B4 | 6/2007 |
| DE | 102012216131 A1 | 5/2014 |

(Continued)

OTHER PUBLICATIONS

Partial International Search Report for International Application No. PCT/EP2019/063206, dated Sep. 12, 2019, 1 page.

(Continued)

*Primary Examiner* — Eli D. Strah
(74) *Attorney, Agent, or Firm* — Abel Schillinger, LLP; Chi Suk Kim

(57) ABSTRACT

An adhesive composite is provided that may include a substrate and an adhesive layer overlying the substrate. The adhesive layer may include at least a first region of a high Tg adhesive material and a second region of a low Tg adhesive material. The first region of the adhesive layer may be co-planar with the second region of the adhesive layer. The high Tg adhesive material may include a first glass transition temperature Tg1 and the low Tg adhesive material may include a second glass transition temperature Tg2, where Tg1 is greater than Tg2.

13 Claims, 5 Drawing Sheets

Related U.S. Application Data

(60) Provisional application No. 62/675,231, filed on May 23, 2018.

(56) References Cited

U.S. PATENT DOCUMENTS

| | | | |
|---|---|---|---|
| 11,661,535 B2* | 5/2023 | Scheffel | F16D 65/0006 |
| | | | 428/212 |
| 2009/0291279 A1 | 11/2009 | Schroeer et al. | |
| 2011/0061324 A1 | 3/2011 | Tinianov | |
| 2011/0149211 A1* | 6/2011 | Ha | B05D 5/10 |
| | | | 359/483.01 |
| 2015/0004345 A1 | 1/2015 | Chaung et al. | |
| 2015/0218804 A1* | 8/2015 | Payot | E04B 1/84 |
| | | | 181/294 |
| 2015/0267088 A1* | 9/2015 | Bogner | C09J 7/385 |
| | | | 156/60 |
| 2017/0121564 A1 | 5/2017 | Cho et al. | |
| 2017/0152904 A1 | 6/2017 | Lee et al. | |
| 2019/0283362 A1 | 9/2019 | Milliman et al. | |
| 2022/0403209 A1* | 12/2022 | Salnikov | C09J 7/10 |

FOREIGN PATENT DOCUMENTS

| | | |
|---|---|---|
| WO | 2005035679 A1 | 4/2005 |
| WO | 2006105819 A1 | 10/2006 |

OTHER PUBLICATIONS

International Search Report and Written Opinion for PCT Application No. PCT/EP2019/063206, dated Nov. 5, 2019, 21 pages.

\* cited by examiner

ADHESIVE COMPOSITE AND METHOD OF FORMING AN ADHESIVE COMPOSITE

CROSS-REFERENCE TO RELATED APPLICATION(S)

This application is a divisional of and claims priority under 35 U.S.C. § 120 to U.S. patent application Ser. No. 16/419,127, entitled "ADHESIVE COMPOSITE AND METHOD OF FORMING AN ADHESIVE COMPOSITE," filed on May 22, 2019, naming as inventors Jan SCHEFFEL et al., which claims priority under 35 U.S.C. § 119(e) to U.S. Provisional Patent Application No. 62/675,231, entitled "ADHESIVE COMPOSITE AND METHOD OF FORMING AN ADHESIVE COMPOSITE," filed on May 23, 2018, naming as inventors Jan SCHEFFEL et al., both of which are assigned to the current assignee hereof and incorporated herein by reference in their entireties.

FIELD OF THE DISCLOSURE

The present disclosure relates to adhesive composites, and more particularly to, adhesive composites useful in sound dampening applications.

BACKGROUND

Adhesive composites that include pressure sensitive adhesives (PSA), in particular, adhesive composites used in sound dampening applications (i.e., brake shim applications) can be utilized to affect sound propagation through a given material. However, particular pressure sensitive adhesives can only affect sound propagation when used within certain temperature ranges. For example, particular pressure sensitive adhesives are known to dampen noise, i.e., brake noise or the brake squeal of brake systems, when operating within certain low temperature ranges, i.e., from −20° C. to 20° C., within certain medium temperature ranges, i.e. 0° C. to 40° C. or within certain high temperature ranges, i.e., 30° C. up to 80° C. When these pressure sensitive adhesives operate outside of their known working temperature range, they break down, fail to maintain their adhesive performance and fail to maintain their sound propagation capabilities. Accordingly, there is a continuing need for improved adhesive composite designs that are able to maintain sound propagation capabilities (i.e., sound dampening capabilities) over broad temperature ranges.

BRIEF DESCRIPTION OF THE DRAWINGS

Embodiments are illustrated by way of example and are not limited to the accompanying figures.

Figure 1:
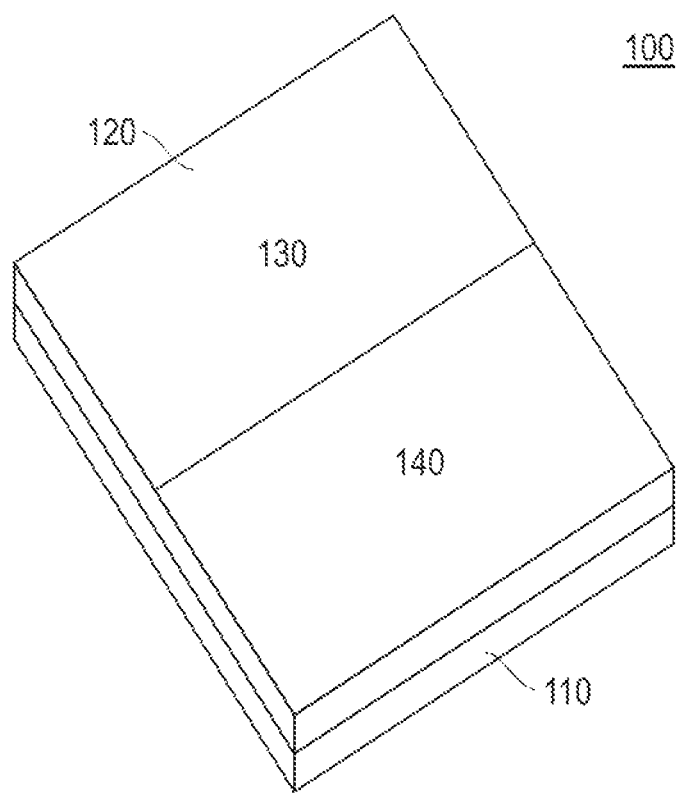
FIG. 1 includes an illustration of an adhesive composite according to embodiments described herein.

Skilled artisans appreciate that elements in the figures are illustrated for simplicity and clarity and have not necessarily been drawn to scale.

SUMMARY

According to a first aspect, an adhesive composite may include a substrate and an adhesive layer overlying the substrate. The adhesive layer may include at least a first region of a high Tg adhesive material and a second region of a low Tg adhesive material. The first region of the adhesive layer may be co-planar with the second region of the adhesive layer. The high Tg adhesive material may include a first glass transition temperature Tg1 and the low Tg adhesive material may include a second glass transition temperature Tg2, where Tg1 is greater than Tg2.

According to yet another aspect, an adhesive composite may include a substrate and an adhesive layer overlying the substrate. The adhesive layer may include at least a first region of a high Tg adhesive material and a second region of a low Tg adhesive material. The first region of the adhesive layer may be co-planar with the second region of the adhesive layer. The high Tg adhesive material may include a complex shear modulus $G^*_{(-20)}1$ as measured at −20° C. and the low Tg adhesive material may include a complex shear modulus $G^*_{(-20)}2$ as measured at −20° C., where $G^*_{(-20)}1$ is greater than $G^*_{(-20)}2$.

According to yet another aspect, an adhesive composite may include a substrate and an adhesive layer overlying the substrate. The adhesive layer may include at least a first region of a high Tg adhesive material and a second region of a low Tg adhesive material. The first region of the adhesive layer may be co-planar with the second region of the adhesive layer. The high Tg adhesive material may include a complex shear modulus $G^*_{(60)}1$ as measured at 60° C. and the low Tg adhesive material may include a complex shear modulus $G^*_{(60)}2$ as measured at 60° C., where $G^*_{(60)}1$ is greater than $G^*_{(60)}2$.

According to yet another aspect, an adhesive composite may include a substrate and an adhesive layer overlying the substrate. The adhesive layer may include at least a first region of a high Tg adhesive material and a second region of a low Tg adhesive material. The first region of the adhesive layer may be co-planar with the second region of the adhesive layer. The high Tg adhesive material may include a peel adhesion PA1 and the low Tg adhesive material may include a peel adhesion PA2, where PA1 is less than PA2.

According to yet another aspect, an adhesive composite may include a substrate and an adhesive layer overlying the substrate. The adhesive layer may include at least a first region of a high Tg adhesive material and a second region of a low Tg adhesive material. The first region of the adhesive layer may be co-planar with the second region of the adhesive layer. The high Tg adhesive material may include a dynamic shear strength DS1 and the low Tg adhesive material may include a dynamic shear strength DS2, where DS1 is greater than DS2.

According to yet another aspect, an adhesive composite may include a substrate and an adhesive layer overlying the substrate. The adhesive layer may include at least a first region of a high Tg adhesive material and a second region of a low Tg adhesive material. The first region of the adhesive layer may be co-planar with the second region of the adhesive layer. The high Tg adhesive material may include a high Tg adhesive monomer component A at a concentration of at least about 76 wt. % and not greater than about 90 wt. % for a total weight of the high Tg adhesive material. The high Tg adhesive material may further include a high Tg adhesive monomer component B at a concentration of at least about 7 wt. % and not greater than about 15 wt. % for a total weight of the high Tg adhesive material. The high Tg adhesive material may further include a high Tg monomer C at a concentration of at least about 5 wt. % and not greater than about 10 wt. % for a total weight of the high Tg adhesive material. The high Tg adhesive material may further include difunctional acrylate at a concentration of not greater than about 0.2 wt. % for a total weight of the high Tg adhesive material. The low Tg adhesive material may include a low Tg adhesive monomer component A at a concentration of at least about 88.0 wt. % and not greater than about 92.0 wt. % for a total weight of the low Tg adhesive material. The low Tg adhesive material may further include a low Tg adhesive monomer component B at a concentration of at least about 3.5 wt. % and not greater than about 7 wt. % for a total weight of the low Tg adhesive material. The low Tg adhesive material may further include a low Tg adhesive monomer component C at a concentration of at least about 3 wt. % and not greater than about 6 wt. % for a total weight of the low Tg adhesive material. The low Tg adhesive material may further include resin of hydrogen rosin at a concentration of at least about 3.0 wt. % and not greater than about 7 wt. % for a total weight of the low Tg adhesive material. The low Tg adhesive material may further include difunctional acrylate at a concentration of at least about 0.1 wt. % and not greater than about 0.2 wt. % for a total weight of the low Tg adhesive material.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to adhesive composites that may include a substrate and an adhesive layer overlying the substrate. The adhesive layer may include at least a first region of a high Tg adhesive material and a second region of a low Tg adhesive material. According to certain embodiments, the first region of the adhesive layer may be co-planar with the second region of the adhesive layer.

For purposes of illustration, FIG. 1 shows an adhesive composite according to embodiments described herein. As shown in FIG. 1, an adhesive composite 100 may include a substrate 110 and an adhesive layer 120 overlying the substrate 110. The adhesive layer 120 may include a first region 130 of a high Tg adhesive material and a second region 140 of a low Tg adhesive material. As further shown in FIG. 1, the first region 130 may be generally co-planar with the second region 140. The first region 130 and the second region 140 may each make up a single zone of the adhesive layer 120, where the single zone of first region 130 is contiguous with the single zone of the second region 140.

According to still other embodiments, the first region of the adhesive layer may include multiple zones, where each zone of the first region includes the high Tg adhesive material and the second region of the adhesive layer may include multiple zone, where each zone of the second region include the low Tg adhesive material. The multiple zones of the first region and the multiple zones of the second region may be co-planar. The multiple zones of the first region and the multiple zone of the second region may be arranged in repeating or alternating pattern. It will be appreciated that embodiments described herein may include any repeating or alternating patterns where at least a portion of the multiple zones of the first region are contiguous with at least a portion of the multiple zones of the second region.

Figure 2:
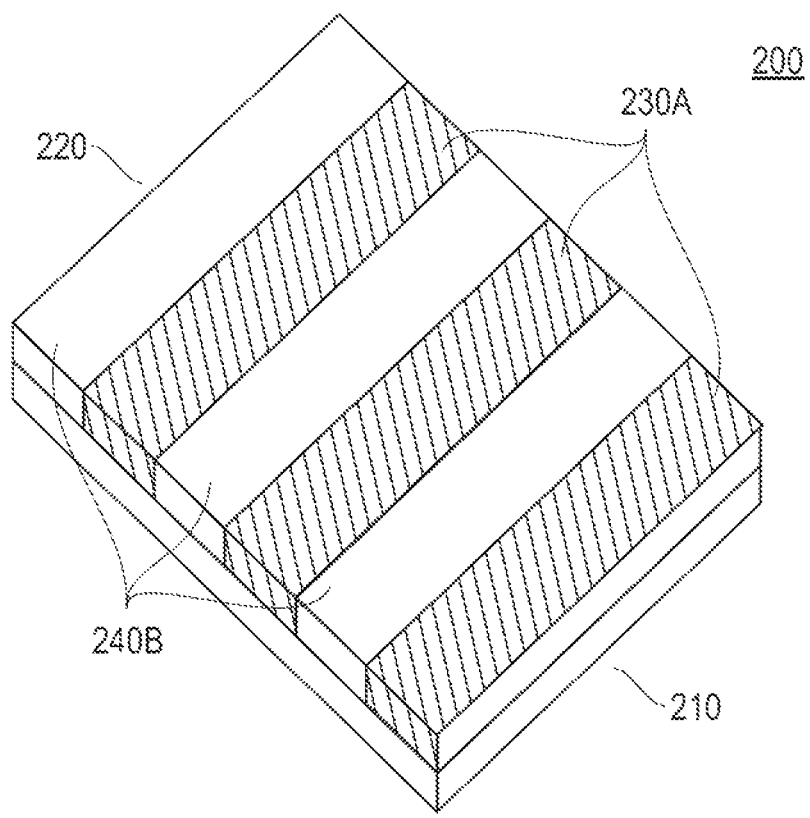
FIG. 2 includes an illustration of an adhesive composite according to embodiments described herein.

FIG. 2 shows an adhesive composite according to certain embodiments wherein the alternating pattern of the materials making up the adhesive layer is a striped pattern. As shown in FIG. 2, an adhesive composite 200 may include a substrate 210 and an adhesive layer 220 overlying the substrate 210. The adhesive layer 220 may include a first region 230 of a high Tg adhesive material and a second region 240 of a low Tg adhesive material. The first region 230 of the high Tg adhesive material may be divided into multiple striped zones 230A. The second region 240 of the low Tg adhesive material may be divided into multiple striped zones 240B. As shown in FIG. 2, the multiple striped zones 230A and the multiple striped zones 240B may be arranged as a pattern of laterally aligned alternating stripes.

According to certain embodiments, the alternating stripe zones 230A and 240B may have substantially the same width. According to yet other embodiments, the alternating stripe zones 230A and 240B may be substantially parallel with each other.

According to still other embodiments the alternating stipe zones 230A may have a particular width. For example, the alternating stripe zones 230A may have a width of at least about 0.01 mm, such as, at least about 0.02 mm or at least about 0.03 or at least about 0.04 or at least about 0.05 mm or at least about 0.06 mm or at least about 0.07 mm or at least about 0.08 mm or at least about 0.09 mm or at least about 0.1 mm or at least about 0.5 mm or at least about 1.0 mm or at least about 1.5 mm or at least about 2.0 mm or at least about 2.5 mm or at least at least about 3.0 mm or at least about 3.5 mm or even at least about 4.0 mm. According to yet other embodiments, the alternating stipe zones 230A may have a width of not greater than about 7 mm, such as, not greater than about 6.9 mm or not greater than about 6.8 mm or not greater than about 6.7 mm or not greater than about 6.6 mm or not greater than about 6.5 mm or not greater than about 6.4 mm or not greater than about 6.3 mm or not greater than about 6.2 mm or not greater than about 6.1 mm or not greater than about 6.0 mm or not greater than about 5.9 mm or not greater than about 5.8 mm or not greater than about 5.7 mm or not greater than about 5.6 mm or even not greater than about 5.5 mm. It will be appreciated that the width of the alternating stipe zones 230A may be any value between any of the minimum and maximum values noted above. It will be further appreciated that the width of the alternating stipe zones 230A may be any value within a range between any of the minimum and maximum values noted above.

According to still other embodiments the alternating stipe zones 240B may have a particular width. For example, the alternating stripe zones 240B may have a width of at least about 0.01 mm, such as, at least about 0.02 mm or at least about 0.03 or at least about 0.04 or at least about 0.05 mm or at least about 0.06 mm or at least about 0.07 mm or at least about 0.08 mm or at least about 0.09 mm or at least about 0.1 mm or at least about 0.5 mm or at least about 1.0 mm or at least about 1.5 mm or at least about 2.0 mm or at least about 2.5 mm or at least at least about 3.0 mm or at least about 3.5 mm or even at least about 4.0 mm. According to yet other embodiments, the alternating stipe zones 240B may have a width of not greater than about 7 mm, such as, not greater than about 6.9 mm or not greater than about 6.8 mm or not greater than about 6.7 mm or not greater than about 6.6 mm or not greater than about 6.5 mm or not greater than about 6.4 mm or not greater than about 6.3 mm or not greater than about 6.2 mm or not greater than about 6.1 mm or not greater than about 6.0 mm or not greater than about 5.9 mm or not greater than about 5.8 mm or not greater than about 5.7 mm or not greater than about 5.6 mm or even not greater than about 5.5 mm. It will be appreciated that the width of the alternating stipe zones 240B may be any value between any of the minimum and maximum values noted above. It will be further appreciated that the width of the alternating stipe zones 240B may be any value within a range between any of the minimum and maximum values noted above.

Figure 3:
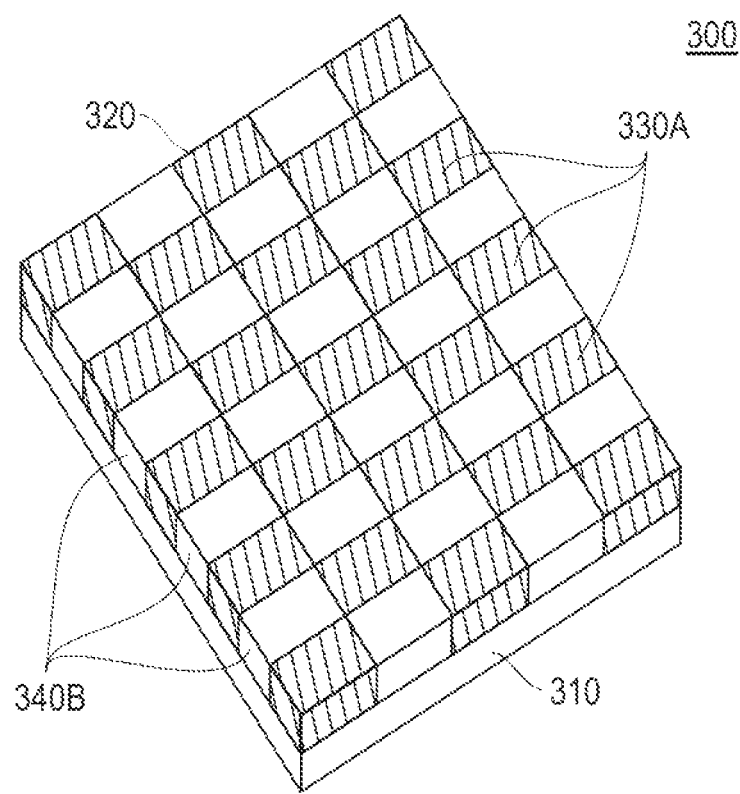
FIG. 3 includes an illustration of an adhesive composite according to embodiments described herein.

FIG. 3 shows an adhesive composite according to certain embodiments wherein the alternating pattern of the materials making up the adhesive layer is a checkered box pattern. As shown in FIG. 3, an adhesive composite 300 may include a substrate 310 and an adhesive layer 320 overlying the substrate 310. The adhesive layer 320 may include a first region 330 of a high Tg adhesive material and a second region 340 of a low Tg adhesive material. The first region 330 of the high Tg adhesive material may be divided into multiple boxed zones 330A. The second region 340 of the low Tg adhesive material may be divided into multiple boxed zones 340B. As shown in FIG. 3, the multiple boxed zones 330A and the multiple striped zones 340B may be arranged as a checkered box pattern.

According to certain embodiments, the boxed zones 330A and 340B may have substantially the same width and height.

According to still other embodiments the boxed zones 330A may have a particular width. For example, the boxed zones 330A may have a width of at least about 0.01 mm, such as, at least about 0.02 mm or at least about 0.03 or at least about 0.04 or at least about 0.05 mm or at least about 0.06 mm or at least about 0.07 mm or at least about 0.08 mm or at least about 0.09 mm or at least about 0.1 mm or at least about 0.5 mm or at least about 1.0 mm or at least about 1.5 mm or at least about 2.0 mm or at least about 2.5 mm or at least at least about 3.0 mm or at least about 3.5 mm or even at least about 4.0 mm. According to yet other embodiments, the boxed zones 330A may have a width of not greater than about 7 mm, such as, not greater than about 6.9 mm or not greater than about 6.8 mm or not greater than about 6.7 mm or not greater than about 6.6 mm or not greater than about 6.5 mm or not greater than about 6.4 mm or not greater than about 6.3 mm or not greater than about 6.2 mm or not greater than about 6.1 mm or not greater than about 6.0 mm or not greater than about 5.9 mm or not greater than about 5.8 mm or not greater than about 5.7 mm or not greater than about 5.6 mm or even not greater than about 5.5 mm. It will be appreciated that the width of the boxed zones 330A may be any value between any of the minimum and maximum values noted above. It will be further appreciated that the width of the boxed zones 330A may be any value within a range between any of the minimum and maximum values noted above.

According to still other embodiments the boxed zones 340B may have a particular width. For example, the boxed zones 340B may have a width of at least about 0.01 mm, such as, at least about 0.02 mm or at least about 0.03 or at least about 0.04 or at least about 0.05 mm or at least about 0.06 mm or at least about 0.07 mm or at least about 0.08 mm or at least about 0.09 mm or at least about 0.1 mm or at least about 0.5 mm or at least about 1.0 mm or at least about 1.5 mm or at least about 2.0 mm or at least about 2.5 mm or at least at least about 3.0 mm or at least about 3.5 mm or even at least about 4.0 mm. According to yet other embodiments, the boxed zones 340B may have a width of not greater than about 7 mm, such as, not greater than about 6.9 mm or not greater than about 6.8 mm or not greater than about 6.7 mm or not greater than about 6.6 mm or not greater than about 6.5 mm or not greater than about 6.4 mm or not greater than about 6.3 mm or not greater than about 6.2 mm or not greater than about 6.1 mm or not greater than about 6.0 mm or not greater than about 5.9 mm or not greater than about 5.8 mm or not greater than about 5.7 mm or not greater than about 5.6 mm or even not greater than about 5.5 mm. It will be appreciated that the width of the boxed zones 340B may be any value between any of the minimum and maximum values noted above. It will be further appreciated that the width of the boxed zones 340B may be any value within a range between any of the minimum and maximum values noted above.

According to still other embodiments the boxed zones 330A may have a particular height. For example, the boxed zones 330A may have a height of at least about 0.01 mm, such as, at least about 0.02 mm or at least about 0.03 or at least about 0.04 or at least about 0.05 mm or at least about 0.06 mm or at least about 0.07 mm or at least about 0.08 mm or at least about 0.09 mm or at least about 0.1 mm or at least about 0.5 mm or at least about 1.0 mm or at least about 1.5 mm or at least about 2.0 mm or at least about 2.5 mm or at least at least about 3.0 mm or at least about 3.5 mm or even at least about 4.0 mm. According to yet other embodiments, the boxed zones 330A may have a height of not greater than about 7 mm, such as, not greater than about 6.9 mm or not greater than about 6.8 mm or not greater than about 6.7 mm or not greater than about 6.6 mm or not greater than about 6.5 mm or not greater than about 6.4 mm or not greater than about 6.3 mm or not greater than about 6.2 mm or not greater than about 6.1 mm or not greater than about 6.0 mm or not greater than about 5.9 mm or not greater than about 5.8 mm or not greater than about 5.7 mm or not greater than about 5.6 mm or even not greater than about 5.5 mm. It will be appreciated that the height of the boxed zones 330A may be any value between any of the minimum and maximum values noted above. It will be further appreciated that the height of the boxed zones 330A may be any value within a range between any of the minimum and maximum values noted above.

According to still other embodiments the boxed zones 340B may have a particular height. For example, the boxed zones 340B may have a height of at least about 0.01 mm, such as, at least about 0.02 mm or at least about 0.03 or at least about 0.04 or at least about 0.05 mm or at least about 0.06 mm or at least about 0.07 mm or at least about 0.08 mm or at least about 0.09 mm or at least about 0.1 mm or at least about 0.5 mm or at least about 1.0 mm or at least about 1.5 mm or at least about 2.0 mm or at least about 2.5 mm or at least at least about 3.0 mm or at least about 3.5 mm or even at least about 4.0 mm. According to yet other embodiments, the boxed zones 340B may have a height of not greater than about 7 mm, such as, not greater than about 6.9 mm or not greater than about 6.8 mm or not greater than about 6.7 mm or not greater than about 6.6 mm or not greater than about 6.5 mm or not greater than about 6.4 mm or not greater than about 6.3 mm or not greater than about 6.2 mm or not greater than about 6.1 mm or not greater than about 6.0 mm or not greater than about 5.9 mm or not greater than about 5.8 mm or not greater than about 5.7 mm or not greater than about 5.6 mm or even not greater than about 5.5 mm. It will be appreciated that the height of the boxed zones 340B may be any value between any of the minimum and maximum values noted above. It will be further appreciated that the height of the boxed zones 340B may be any value within a range between any of the minimum and maximum values noted above.

Figure 4:
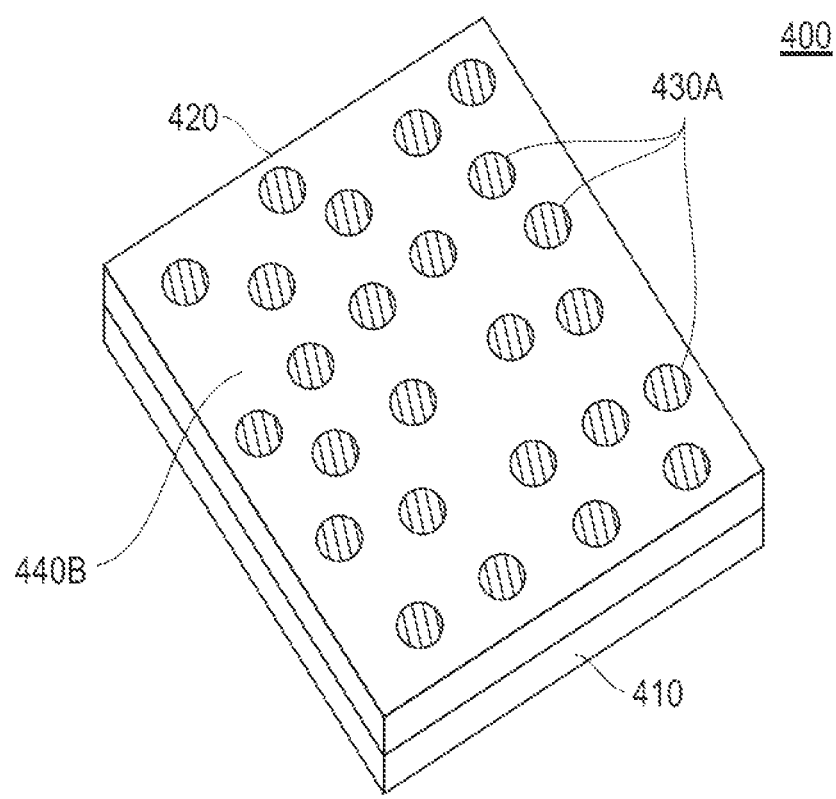
FIG. 4 includes an illustration of an adhesive composite according to embodiments described herein.

FIG. 4 shows an adhesive composite according to certain embodiments where the alternating pattern of the materials making up the adhesive layer is a dotted pattern. As shown in FIG. 4, an adhesive composite 400 may include a substrate 410 and an adhesive layer 420 overlying the substrate 410. The adhesive layer 420 may include a first region 430 of a high Tg adhesive material and a second region 440 of a low Tg adhesive material. The first region 430 of the high Tg adhesive material may be divided into multiple circular dot zones 430A. The second region 440 of the low Tg adhesive material may be an encircling zone 440B. As shown in FIG. 4, the circular dot zones 430A may be encircled by the encircling zone 440B.

According to still other embodiments the circular dot zones 430A may have a particular average diameter. For example, the circular dot zones 430A may have an average diameter of at least about 0.01 mm, such as, at least about 0.02 mm or at least about 0.03 or at least about 0.04 or at least about 0.05 mm or at least about 0.06 mm or at least about 0.07 mm or at least about 0.08 mm or at least about 0.09 mm or at least about 0.1 mm or at least about 0.5 mm or at least about 1.0 mm or at least about 1.5 mm or at least about 2.0 mm or at least about 2.5 mm or at least at least about 3.0 mm or at least about 3.5 mm or even at least about 4.0 mm. According to yet other embodiments, the circular dot zones 430A may have an average diameter of not greater than about 7 mm, such as, not greater than about 6.9 mm or not greater than about 6.8 mm or not greater than about 6.7 mm or not greater than about 6.6 mm or not greater than about 6.5 mm or not greater than about 6.4 mm or not greater than about 6.3 mm or not greater than about 6.2 mm or not greater than about 6.1 mm or not greater than about 6.0 mm or not greater than about 5.9 mm or not greater than about 5.8 mm or not greater than about 5.7 mm or not greater than about 5.6 mm or even not greater than about 5.5 mm. It will be appreciated that the average diameter of the circular dot zones 430A may be any value between any of the minimum and maximum values noted above. It will be further appreciated that the average diameter of the circular dot zones 430A may be any value within a range between any of the minimum and maximum values noted above.

According to certain embodiments, the circular dot zones 430A may have a uniform shape. According to still other embodiments, the circular dot zones 430A may have a uniform size. According to yet other embodiments, the circular dot zones 430A may have varying shapes. According to other embodiments, the circular dot zones 430A may have varying sizes.

Figure 5:
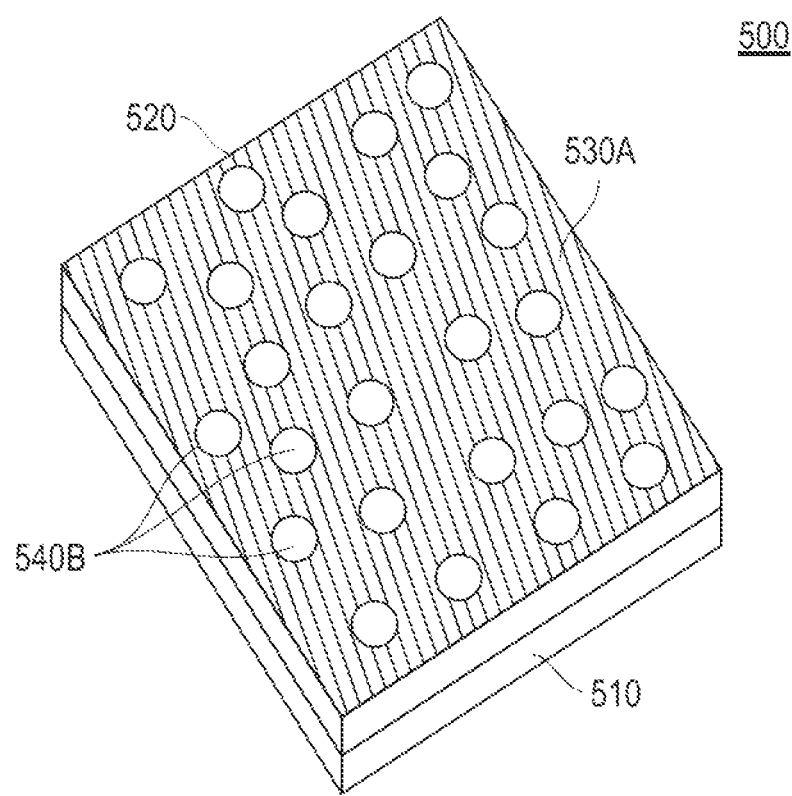
FIG. 5 includes an illustration of an adhesive composite according to embodiments described herein.

FIG. 5 shows an adhesive composite according to certain embodiments where the alternating pattern of the materials making up the adhesive layer is a dotted pattern. As shown in FIG. 5, an adhesive composite 500 may include a substrate 510 and an adhesive layer 520 overlying the substrate 510. The adhesive layer 520 may include a first region 530 of a high Tg adhesive material and a second region 540 of a low Tg adhesive material. The second region 540 of the low Tg adhesive material may be divided into multiple circular dot zones 540B. The first region 530 of the high Tg adhesive material may be an encircling zone 530A. As shown in FIG. 5, the circular dot zones 540B may be encircled by the encircling zone 530A.

According to still other embodiments the circular dot zones 540B may have a particular average diameter. For example, the circular dot zones 540B may have an average diameter of at least about 0.01 mm, such as, at least about 0.02 mm or at least about 0.03 or at least about 0.04 or at least about 0.05 mm or at least about 0.06 mm or at least about 0.07 mm or at least about 0.08 mm or at least about 0.09 mm or at least about 0.1 mm or at least about 0.5 mm or at least about 1.0 mm or at least about 1.5 mm or at least about 2.0 mm or at least about 2.5 mm or at least at least about 3.0 mm or at least about 3.5 mm or even at least about 4.0 mm. According to yet other embodiments, the circular dot zones 540B may have an average diameter of not greater than about 7 mm, such as, not greater than about 6.9 mm or not greater than about 6.8 mm or not greater than about 6.7 mm or not greater than about 6.6 mm or not greater than about 6.5 mm or not greater than about 6.4 mm or not greater than about 6.3 mm or not greater than about 6.2 mm or not greater than about 6.1 mm or not greater than about 6.0 mm or not greater than about 5.9 mm or not greater than about 5.8 mm or not greater than about 5.7 mm or not greater than about 5.6 mm or even not greater than about 5.5 mm. It will be appreciated that the average diameter of the circular dot zones 540B may be any value between any of the minimum and maximum values noted above. It will be further appreciated that the average diameter of the boxed zones 540B may be any value within a range between any of the minimum and maximum values noted above.

According to certain embodiments, the circular dot zones 530B may have a uniform shape. According to still other embodiments, the circular dot zones 540B may have a uniform size. According to yet other embodiments, the circular dot zones 540B may have varying shapes. According to other embodiments, the circular dot zones 540B may have varying sizes.

According to certain embodiments, the high Tg adhesive material may have a particular glass transition temperature Tg1. According to yet other embodiments, the low Tg adhesive material may have a particular glass transition temperature Tg2. For purposes of embodiments described herein, a glass transition temperature of a particular material (i.e., Tg1 or Tg2) is measured according to ISO 6721-1/ASTM D4065.

According to certain embodiments, the glass transition temperature Tg1 may be greater than the second glass transition temperature Tg2.

According to yet other embodiments, the glass transition temperature Tg1 may be at least about 0.5° C., such as, at least about 0.6° C. or at least about 0.7° C. or at least about 0.8° C. or at least about 0.9° C. or at least about 1.0° C. or at least about 1.1° C. or at least about 1.2° C. or at least about 1.3° C. or at least about 1.4° C. or at least about 1.5° C. or at least about 1.6° C. or at least about 1.7° C. or at least about 1.8° C. or at least about 1.9° C. or at least about 2.0° C. or at least about 2.5° C. or even at least about 3.0° C. According to still other embodiments, the glass transition temperature Tg1 may be not greater than about not greater than about 8° C., such as, not greater than about 7.9° C. or not greater than about 7.8° C. or not greater than about 7.7° C. or not greater than about 7.6° C. or not greater than about 7.5° C. or not greater than about 7.4° C. or not greater than about 7.3° C. or not greater than about 7.2° C. or not greater than about 7.1° C. or not greater than about 7.0° C. or not greater than about 6.9° C. or not greater than about 6.8° C. or not greater than about 6.7° C. or not greater than about 6.6° C. or not greater than about 6.5° C. or not greater than about 6.4° C. or not greater than about 6.3° C. or not greater than about 6.2° C. or not greater than about 6.1° C. or not greater than about 6.0° C. or not greater than about 5.5° C. or even not greater than about 5.0° C. It will be appreciated that the glass transition temperature Tg1 may be any value between any of the minimum and maximum values noted above. It will be further appreciated that the glass transition temperature Tg1 may be any value within a range between any of the minimum and maximum values noted above.

According to yet other embodiments, the glass transition temperature Tg2 may be at least about −40° C., such as, at least about −39.5° C. or at least about −39° C. or at least about −38.5° C. or at least about −38° C. or at least about −37.5° C. or at least about −37° C. or at least about −36.5° C. or even at least about −36° C. According to still other embodiments, the glass transition temperature Tg2 may be is not greater than about −22° C., such as, not greater than about −22.5 or not greater than about −23° C. or not greater than about −23.5° C. or not greater than about −24° C. or not greater than about −24.5° C. or not greater than about −25° C. or not greater than about −25.5° C. or not greater than about −26° C. or not greater than about −26.5° C. or not greater than about −27° C. or not greater than about −27.5° C. or not greater than about −28° C. or not greater than about −28.5° C. or not greater than about −29° C. not greater than about −29.5° C. or not greater than about −30° C. or not greater than about −30.5° C. or not greater than about −31° C. or not greater than about −31.5° C. or not greater than about −32° C. or not greater than about −32.5° C. or not greater than about −33° C. or not greater than about −33.5° C. or even not greater than about −34° C. It will be appreciated that the glass transition temperature Tg2 may be any value between any of the minimum and maximum values noted above. It will be further appreciated that the glass transition temperature Tg2 may be any value within a range between any of the minimum and maximum values noted above.

According to certain embodiments, the high Tg adhesive material may have a particular complex shear modulus $G^*_{(-20)}1$. According to yet other embodiments, the low Tg adhesive material may have a particular complex shear modulus $G^*_{(-20)}2$. For purposes of embodiments described herein, a complex shear modulus (i.e., $G^*_{(-20)}1$ or $G^*_{(-20)}2$) is measured according to ISO 6721-1/ASTM D4065 at −20° C.

According to certain embodiments, the complex shear modulus $G^*_{(-20)}1$ may be greater than the complex shear modulus $G^*_{(-20)}2$.

According to still other embodiments, the adhesive layer of the adhesive composite may have a particular ratio $G^*_{(-20)}1$ to $G^*_{(-20)}2$. For example, the ratio of $G^*_{(-20)}1$ to $G^*_{(-20)}2$ may be at least about 3, such as, at least about 4 or at least about 5 or at least about 6 or at least about 7 or at least about 8 or at least about 9 or at least about 10 or at least about 11 or at least about 12 or even at least about 12. According to yet other embodiments, the ratio of $G^*_{(-20)}1$ to $G^*_{(-20)}2$ may be not greater than about 50, such as, not greater than about 48 or not greater than about 45 or not greater than about 43 or not greater than about 40 or not greater than about 38 or not greater than about 35 or not greater than about 33 or not greater than about 30 or not greater than about 29 or not greater than about 28 or not greater than about 27 or not greater than about 26 or not greater than about 25 or not greater than about 24 or not greater than about 23 or not greater than about 22 or not greater than about 21 or even not greater than about 20. It will be appreciated that the ratio of $G^*_{(-20)}1$ to $G^*_{(-20)}2$ may be any value between any of the minimum and maximum values noted above. It will be further appreciated that the ratio of $G^*_{(-20)}1$ to $G^*_{(-20)}2$ may be any value within a range between any of the minimum and maximum values noted above.

According to still other embodiments, the complex shear modulus $G^*_{(-20)}1$ may be at least about 4.5 MPa, such as, at least about 5.0 MPa or at least about 5.5 MPa or at least about 6.0 MPa or at least about 6.5 MPa or even at least about 7 MPa. According to yet other embodiments, the complex shear modulus $G^*_{(-20)}1$ may be not greater than about 10 MPa, such as, not greater than about 9.5 MPa or not greater than about 9.0 MPa or not greater than about 8.5 MPa or not greater than about 8.0 MPa. It will be appreciated that the complex shear modulus $G^*_{(-20)}1$ may be any value between any of the minimum and maximum values noted above. It will be further appreciated that the complex shear modulus $G^*_{(-20)}1$ may be any value within a range between any of the minimum and maximum values noted above.

According to still other embodiments, the complex shear modulus $G^*_{(-20)}2$ may be at least about 0.2 MPa, such as, at least about 0.25 MPa or at least about 0.3 MPa or at least about 0.35 MPa or even at least about 0.4 MPa. According to yet other embodiments, the complex shear modulus $G^*_{(-20)}2$ may be not greater than about 1.5 MPa, such as, not greater than about 1.4 MPa or not greater than about 1.3 MPa or not greater than about 1.2 MPa or not greater than about 1.1 MPa or not greater than about 1.0 MPa or not greater than about 0.9 MPa or not greater than about 0.8 MPa or not greater than about 0.7 MPa or even not greater than about 0.6 MPa. It will be appreciated that the complex shear modulus $G^*_{(-20)}2$ may be any value between any of the minimum and maximum values noted above. It will be further appreciated that the complex shear modulus $G^*_{(-20)}2$ may be any value within a range between any of the minimum and maximum values noted above.

According to certain embodiments, the high Tg adhesive material may have a particular complex shear modulus $G^*_{(60)}1$. According to yet other embodiments, the low Tg adhesive material may have a particular complex shear modulus $G^*_{(60)}2$. For purposes of embodiments described herein, a complex shear modulus (i.e., $G^*_{(60)}1$ or $G^*_{(60)}2$ is measured according to ISO 6721-1/ASTM D4065 at 60° C.

According to certain embodiments, the complex shear modulus $G^*_{(60)}1$ may be greater than the complex shear modulus $G^*_{(60)}2$.

According to still other embodiments, the adhesive layer of the adhesive composite may have a particular ratio $G^*_{(60)}1$ to $G^*_{(60)}2$. For example, the ratio of $G^*_{(60)}1$ to $G^*_{(60)}2$ may be at least about 0.4, such as, at least about 0.5 or at least about 0.6 or at least about 0.7 or at least about 0.8 or at least about 0.9 or at least about 1.0 or at least about 1.1 or at least about 1.2 or at least about 1.3 or at least about 1.4 or at least about 1.5 or at least about 1.6 or at least about 1.7 or at least about 1.8 or at least about 1.9 or at least about 2.0. According to yet other embodiments, the ratio of $G^*_{(60)}1$ to $G^*_{(60)}2$ may be not greater than about 6.4, such as, not greater than about 6.2 or not greater than about 6.0 or not greater than about 5.8 or not greater than about 5.6 or not greater than about 5.4 or not greater than about 5.2 or not greater than about 5.0 or not greater than about 4.8 or not greater than about 4.6 or not greater than about 4.4 or not greater than about 4.2 or not greater than about 4.0 or not greater than about 3.8 or not greater than about 3.6 or not greater than about 3.4 or not greater than about 3.2 or not greater than about 3.0 or even not greater than about 2.8. It will be appreciated that the ratio of $G^*_{(60)}1$ to $G^*_{(60)}2$ may be any value between any of the minimum and maximum values noted above. It will be further appreciated that the ratio of $G^*_{(60)}1$ to $G^*_{(60)}2$ may be any value within a range between any of the minimum and maximum values noted above.

According to still other embodiments, the complex shear modulus $G^*_{(60)}1$ may be at least about 0.01 MPa, such as, at least about 0.011 MPa or at least about 0.012 MPa or at least about 0.013 MPa or at least about 0.014 MPa or at least about 0.015 MPa or at least about 0.016 MPa or at least about 0.017 MPa or at least about 0.018 MPa or at least about 0.019 MPa or even at least about 0.02 MPa. According to yet other embodiments, the complex shear modulus $G^*_{(60)}1$ may be not greater than about 0.045 MPa, such as, not greater than about 0.04 MPa or not greater than about 0.035 MPa or not greater than about 0.03 MPa or even not greater than about 0.025 MPa. It will be appreciated that the complex shear modulus $G^*_{(60)}1$ may be any value between any of the minimum and maximum values noted above. It will be further appreciated that the complex shear modulus $G^*_{(60)}1$ may be any value within a range between any of the minimum and maximum values noted above.

According to still other embodiments, the complex shear modulus $G^*_{(60)}2$ may be at least about 0.007 MPa, such as, at least about 0.0075 MPa or at least about 0.008 MPa or at least about 0.0085 MPa or even at least about 0.009 MPa. According to yet other embodiments, the complex shear modulus $G^*_{(60)}2$ may be not greater than about 0.025 MPa, such as, not greater than about 0.023 MPa or not greater than about 0.020 MPa or not greater than about 0.018 MPa or not greater than about 0.015 MPa or not greater than about 0.013 MPa or even not greater than about 0.01 MPa. It will be appreciated that the complex shear modulus $G^*_{(60)}2$ may be any value between any of the minimum and maximum values noted above. It will be further appreciated that the complex shear modulus $G^*_{(60)}2$ may be any value within a range between any of the minimum and maximum values noted above.

According to certain embodiments, the high Tg adhesive material may have a particular $\tan \delta_{(-20)}1$. According to yet other embodiments, the low Tg adhesive material may have $\tan \delta_{(-20)}2$. For purposes of embodiments described herein, a $\tan \delta_{(-20)}$ (i.e., $\tan \delta_{(-20)}1$ or $\tan \delta_{(-20)}2$) is measured according to ISO 6721-1/ASTM D4065 at −20° C.

According to still other embodiments, the adhesive layer of the adhesive composite may have a particular $\tan \delta_{(-20)}$ combo value C-tan $\delta_{(-20)}$, where C-tan $\delta_{(-20)}=(\tan \delta_{(-20)}1+\tan \delta_{(-20)}2)/2$. For example, the C-tan $\delta_{-2}o$ may be at least about 0.75, such as, at least about 0.76 or at least about 0.77 or even at least about 0.78. According to yet other embodiments, the C-tan $\delta_{(-20)}$ may be not greater than about 0.92, such as, not greater than about 0.91 or not greater than about 0.91 or not greater than about 0.90 or not greater than about 89 or not greater than about 0.88 or not greater than about 0.87 or not greater than about 0.86 or not greater than about 0.85 or not greater than about 0.84 or not greater than about 0.83 or not greater than about 0.82 or even not greater than about 0.81. It will be appreciated that the C-tan $\delta_{(-2}o$ may be any value between any of the minimum and maximum values noted above. It will be further appreciated that the C-tan $\delta_{(-20)}$ may be any value within a range between any of the minimum and maximum values noted above.

According to still other embodiments, the $\tan \delta_{(-20)}1$ may be at least about 0.42, such as, at least about 0.43 or at least about 0.44 or at least about 0.45 or at least about 0.46. According to yet other embodiments, the $\tan \delta_{(-20)}1$ may be not greater than about 0.52, such as, not greater than about 0.51 or not greater than about 0.50 or not greater than about 0.49 or not greater than about 0.48. It will be appreciated that the $\tan \delta_{(-20)}1$ may be any value between any of the minimum and maximum values noted above. It will be further appreciated that the $\tan \delta_{(-20)}1$ may be any value within a range between any of the minimum and maximum values noted above.

According to still other embodiments, the $\tan \delta_{(-20)}2$ may be at least about 1.10, such as, at least about 1.11 or at least about 1.12 or even at least about 1.13. According to yet other embodiments, the $\tan \delta_{(-20)}2$ may be not greater than about 1.31, such as, not greater than about 1.30 or not greater than about 1.29 or not greater than about 1.28 or not greater than about 1.27 or not greater than about 1.26 or not greater than about 1.25 or not greater than about 1.24 or not greater than about 1.23 or not greater than about 1.21 or not greater than about 1.20 or not greater than about 1.19 or not greater than about 1.18 or not greater than about 1.17 or not greater than about 1.16 or not greater than about 1.15 or even not greater than about 1.14. It will be appreciated that the $\tan \delta_{(-20)}2$ may be any value between any of the minimum and maximum values noted above. It will be further appreciated that the $\tan \delta_{(-20)}2$ may be any value within a range between any of the minimum and maximum values noted above.

According to certain embodiments, the high Tg adhesive material may have a particular $\tan \delta_{(20)}1$. According to yet other embodiments, the low Tg adhesive material may have $\tan \delta_{(20)}2$. For purposes of embodiments described herein, a $\tan \delta_{(20)}$ (i.e., $\tan \delta_{(20)}1$ or $\tan \delta_{(20)}2$) is measured according to ISO 6721-1/ASTM D4065 at 20° C.

According to still other embodiments, the adhesive layer of the adhesive composite may have a particular $\tan \delta_{(20)}$ combo value C-tan $\delta_{(20)}$, where C-tan $\delta_{(20)}=(\tan \delta_{(20)}1+\tan \delta_{(20)}2)/2$. For example, the C-tan $\delta_{(20)}$ may be at least about 0.78, such as, at least about 0.79 or at least about 0.80 or at least about 0.81 or at least about 0.82 or even at least about 0.83. According to yet other embodiments, the C-tan $\delta_{(20)}$ may be not greater than about 0.93, such as, not greater than about 0.92 or not greater than about 0.91 or not greater than about 0.90 or not greater than about 89 or not greater than about 0.88 or not greater than about 0.87 or not greater than about 0.86 or even not greater than about 0.85. It will be appreciated that the C-tan $\delta_{(20)}$ may be any value between any of the minimum and maximum values noted above. It will be further appreciated that the C-tan $\delta_{(20)}$ may be any value within a range between any of the minimum and maximum values noted above.

According to still other embodiments, the $\tan \delta_{(20)}1$ may be at least about 0.85, such as, at least about 0.86 or at least about 0.87 or at least about 0.88 or at least about 0.89 or at least about 0.90 or at least about 0.91 or at least about 0.92 or at least about 0.93 or even at least about 0.94. According to yet other embodiments, the tan $\delta_{(20)}1$ may be not greater than about 0.99, such as, not greater than about 0.98 or not greater than about 0.97 or even not greater than about 0.96. It will be appreciated that the tan $\delta_{(20)}1$ may be any value between any of the minimum and maximum values noted above. It will be further appreciated that the tan $\delta_{(20)}1$ may be any value within a range between any of the minimum and maximum values noted above.

According to still other embodiments, the tan $\delta_{(20)}2$ may be at least about 0.71, such as, at least about 0.715 or even at least about 0.72. According to yet other embodiments, the tan $\delta_{(20)}2$ may be not greater than about 0.87, such as, not greater than about 0.86 or not greater than about 0.85 or not greater than about 0.84 or not greater than about 0.83 or not greater than about 0.82 or not greater than about 0.81 or not greater than about 0.80 or not greater than about 0.79 or not greater than about 0.78 or not greater than about 0.76 or not greater than about 0.75 or even not greater than about 0.74. It will be appreciated that the tan $\delta_{(20)}2$ may be any value between any of the minimum and maximum values noted above. It will be further appreciated that the tan $\delta_{(20)}2$ may be any value within a range between any of the minimum and maximum values noted above.

According to certain embodiments, the high Tg adhesive material may have a particular tan $\delta_{(60)}1$. According to yet other embodiments, the low Tg adhesive material may have tan $\delta_{(60)}2$. For purposes of embodiments described herein, a tan $\delta_{(60)}$ (i.e., tan $\delta_{(60)}1$ or tan $\delta_{(60)}2$) is measured according to ISO 6721-1/ASTM D4065 at 60° C.

According to still other embodiments, the adhesive layer of the adhesive composite may have a particular tan $\delta_{(60)}$ combo value C-tan $\delta_{(60)}$, where C-tan $\delta_{(60)}$=(tan $\delta_{(60)}1$+tan $\delta_{(60)}2$)/2. For example, the C-tan $\delta_{(60)}$ may be at least about 0.42, such as, at least about 0.43 or at least about 0.44 or at least about 0.45 or at least about 0.46 or at least about 0.47 or at least about 0.48 or at least about 0.49 or at least about 0.50 or even at least about 0.51. According to yet other embodiments, the C-tan $\delta_{(60)}$ may be not greater than about 0.66, such as, not greater than about 0.65 or not greater than about 0.64 or not greater than about 0.63 or not greater than about 0.62 or not greater than about 0.61 or not greater than about 0.60 or not greater than about 0.59 or not greater than about 0.58 or not greater than about 0.57 or not greater than about 0.56 or not greater than about 0.55 or not greater than about 0.54 or even not greater than about 0.53. It will be appreciated that the C-tan $\delta_{(60)}$ may be any value between any of the minimum and maximum values noted above. It will be further appreciated that the C-tan $\delta_{(60)}$ may be any value within a range between any of the minimum and maximum values noted above.

According to still other embodiments, the tan $\delta_{(60)}1$ may be at least about 0.3, such as, or at least about 0.33 or at least about 0.35 or at least about 0.38 or at least about 0.40 or at least about 0.41 or even at least about 0.42. According to yet other embodiments, the tan $\delta_{(60)}1$ may be not greater than about 0.46, such as, not greater than about 0.45 or not greater than about 0.44 or even not greater than about 0.43. It will be appreciated that the tan $\delta_{(60)}1$ may be any value between any of the minimum and maximum values noted above. It will be further appreciated that the tan $\delta_{(60)}1$ may be any value within a range between any of the minimum and maximum values noted above.

According to still other embodiments, the tan $\delta_{(60)}2$ may be at least about 0.54, such as, at least about 0.55 or at least about 0.56 or at least about 0.57 or at least about 0.58 or at least about 0.59 or even at least about 0.6. According to yet other embodiments, the tan $\delta_{(60)}2$ may be not greater than about 0.87, such as, not greater than about 0.85 or not greater than about 0.82 or not greater than about 0.80 or not greater than about 0.77 or not greater than about 0.75 or not greater than about 0.72 or not greater than about 0.70 or not greater than about 0.67 or not greater than about 0.65 or even not greater than about 0.63. It will be appreciated that the tan $\delta_{(60)}2$ may be any value between any of the minimum and maximum values noted above. It will be further appreciated that the tan $\delta_{(60)}2$ may be any value within a range between any of the minimum and maximum values noted above.

According to certain embodiments, the high Tg adhesive material may have a particular stainless steel peel strength $SS_{PS1}$. According to yet other embodiments, the low Tg adhesive material may have a particular steel peel strength $SS_{PS2}$. For purposes of embodiments described herein, a stainless steel peel strength (i.e., $SS_{PS1}$ or $SS_{PS2}$) is measured according to AFERA 5001.

According to yet other embodiments, the stainless steel peel strength $SS_{PS1}$ may be at least about 8.4 N/cm, such as, at least about 8.5 N/cm or at least about 8.6 N/cm or at least about 8.7 N/cm or at least about 8.8 N/cm or at least about 8.9 N/cm or at least about 9.0 N/cm or at least about 9.1 N/cm or at least about 9.2 N/cm or at least about 9.3 N/cm or at least about 9.4 N/cm or at least about 9.5 N/cm or at least about 9.6 N/cm or at least about 9.7 N/cm or at least about 9.8 N/cm or at least about 9.9 N/cm or even at least about 10.0 N/cm. According to still other embodiments, the stainless steel peel strength $SS_{PS1}$ may be not greater than about 12 N/cm, such as, not greater than about 11.9 N/cm or not greater than about 11.8 N/cm or not greater than about 11.7 N/cm or not greater than about 11.6 N/cm or not greater than about 11.5 N/cm or not greater than about 11.4 N/cm or not greater than about 11.3 N/cm or not greater than about 11.2 N/cm or not greater than about 11.1 N/cm or not greater than about 11.0 N/cm or not greater than about 10.9 N/cm or not greater than about 10.8 N/cm or not greater than about 10.7 N/cm or not greater than about 10.6 N/cm or even not greater than about 10.5 N/cm. It will be appreciated that the stainless steel peel strength $SS_{PS1}$ may be any value between any of the minimum and maximum values noted above. It will be further appreciated that the stainless steel peel strength $SS_{PS1}$ may be any value within a range between any of the minimum and maximum values noted above.

According to still other embodiments, the stainless steel peel strength $SS_{PS2}$ may be at least about 7.6 N/cm, such as, at least about 7.7 N/cm or at least about 7.8 N/cm or at least about 7.9 N/cm or at least about 8.0 N/cm or at least about 8.1 N/cm or at least about 8.2 N/cm or at least about 8.3 N/cm or at least about 8.4 N/cm or even at least about 8.5 N/cm. According to yet other embodiments, the stainless steel peel strength $SS_{PS2}$ may be not greater than about 9.6 N/cm, such as, not greater than about 9.5 N/cm or not greater than about 9.4 N/cm or not greater than about 9.3 N/cm or not greater than about 9.2 N/cm or not greater than about 9.1 N/cm or even not greater than about 9.0 N/cm. It will be appreciated that the stainless steel peel strength $SS_{PS2}$ may be any value between any of the minimum and maximum values noted above. It will be further appreciated that the stainless steel peel strength $SS_{PS2}$ may be any value within a range between any of the minimum and maximum values noted above.

According to certain embodiments, the high Tg adhesive material may have a particular MSE peel strength $MSE_{PS1}$. According to yet other embodiments, the low Tg adhesive material may have a particular MSE peel strength $MSE_{PS2}$.

For purposes of embodiments described herein, a MSE peel strength (i.e., $MSE_{PS1}$ or $MSE_{PS2}$) is measured according to ASTM D 4498.

According to yet other embodiments, the stainless steel peel strength $MSE_{PS1}$ may be at least about 6.4 N/cm, such as, at least about 6.5 N/cm or at least about 6.6 N/cm or at least about 6.7 N/cm or at least about 6.8 N/cm or at least about 6.9 N/cm or even at least about 7.0 N/cm. According to still other embodiments, the stainless steel peel strength $MSE_{PS1}$ may be not greater than about 8.8 N/cm, such as, not greater than about 8.7 N/cm or not greater than about 8.6 N/cm or not greater than about 8.5 N/cm or not greater than about 8.4 N/cm or not greater than about 8.3 N/cm or not greater than about 8.2 N/cm or not greater than about 8.1 N/cm or not greater than about 8.0 N/cm or not greater than about 7.9 N/cm or not greater than about 7.8 N/cm or not greater than about 7.7 N/cm or not greater than about 7.6 N/cm or even not greater than about 7.5 N/cm. It will be appreciated that the stainless steel peel strength $MSE_{PS1}$ may be any value between any of the minimum and maximum values noted above. It will be further appreciated that the stainless steel peel strength $MSE_{PS1}$ may be any value within a range between any of the minimum and maximum values noted above.

According to still other embodiments, the stainless steel peel strength $MSE_{PS2}$ may be at least about 7.6 N/cm, such as, at least about 7.7 N/cm or at least about 7.8 N/cm or at least about 7.9 N/cm or even at least about 8.0 N/cm. According to yet other embodiments, the stainless steel peel strength $MSE_{PS2}$ may be not greater than about 8.8 N/cm, such as, not greater than about 8.7 N/cm or not greater than about 8.6 N/cm or not greater than about 8.5 N/cm or not greater than about 8.4 N/cm or not greater than about 8.3 N/cm or even not greater than about 8.2 N/cm. It will be appreciated that the stainless steel peel strength $MSE_{PS2}$ may be any value between any of the minimum and maximum values noted above. It will be further appreciated that the stainless steel peel strength $MSE_{PS2}$ may be any value within a range between any of the minimum and maximum values noted above.

According to certain embodiments, the high Tg adhesive material may have a particular dynamic shear DS1. According to yet other embodiments, the low Tg adhesive material may have a particular dynamic shear DS1. For purposes of embodiments described herein, a dynamic shear (i.e., DS1 or DS2) is measured according to FTM 8.

According to certain embodiments, the dynamic shear DS1 may be at least about 0.7 MPa, such as, at least about 0.75 MPa or at least about 0.8 MPa or at least about 0.85 MPa or at least about 0.9 MPa or at least about 0.95 MPa or at least about 1.0 MPa or even at least about 1.05 MPa. According to still other embodiments, the dynamic shear DS1 may be not greater than about 2.0 MPa, such as, not greater than about 1.95 MPa or not greater than about 1.9 MPa or not greater than about 1.85 MPa or not greater than about 1.8 MPa or not greater than about 1.75 MPa or not greater than about 1.7 MPa or not greater than about 1.65 MPa or not greater than about 1.6 MPa or not greater than about 1.55 MPa or not greater than about 1.5 MPa or not greater than about 1.45 MPa. It will be appreciated that the dynamic shear DS1 may be any value between any of the minimum and maximum values noted above. It will be further appreciated that the dynamic shear DS1 may be any value within a range between any of the minimum and maximum values noted above.

According to certain embodiments, the dynamic shear DS2 may be at least about 0.15 MPa, such as, at least about 0.17 MPa or at least about 0.20 MPa or least about 0.22 MPa or at least about 0.25 MPa. According to still other embodiments, the dynamic shear DS2 may be not greater than about 1.0 MPa, such as, not greater than about 0.95 MPa or not greater than about 0.9 MPa or not greater than about 0.85 MPa or not greater than about 0.8 MPa or not greater than about 0.75 MPa or not greater than about 0.7 MPa or not greater than about 0.65 MPa or not greater than about 0.6 MPa or even not greater than about 0.55 MPa. It will be appreciated that the dynamic shear DS2 may be any value between any of the minimum and maximum values noted above. It will be further appreciated that the dynamic shear DS2 may be any value within a range between any of the minimum and maximum values noted above.

According to still other embodiments, the adhesive composite may have a particular damping factor. For purposes of embodiments described herein, a damping factor is measured according to SAEJ 3001.

According to certain embodiments, the adhesive composite may have a damping factor of at least about 0.5% over a temperature range of between −20° C. and 60° C., such as, at least about 0.6% over a temperature range of between −20° C. and 60° C. or at least about 0.7% over a temperature range of between −20° C. and 60° C. or at least about 0.8% over a temperature range of between −20° C. and 60° C. or at least about 0.9% over a temperature range of between −20° C. and 60° C. or at least about 1.0% over a temperature range of between −20° C. and 60° C. or at least about 1.1% over a temperature range of between −20° C. and 60° C. or at least about 1.2% over a temperature range of between −20° C. and 60° C. or at least about 1.3% over a temperature range of between −20° C. and 60° C. or at least about 1.4% over a temperature range of between −20° C. and 60° C. or even at least about % over a temperature range of between −20° C. and 60° C. It will be appreciated that the damping factor of the adhesive composite may be any value between any of the values noted above. It will be further appreciated that the damping factor of the adhesive composite may be any value within a range between any of the values noted above.

According to still other embodiments, the high Tg adhesive material may include a high Tg adhesive monomer component A at a particular concentration. For example, the high Tg adhesive material may include a high Tg adhesive monomer component A at a concentration of at least about 76 wt. % for a total weight of the high Tg adhesive material, such as, at least about 76.5 wt. % or at least about 77 wt. % or at least about 77.5 wt. % or at least about 78 wt. % or at least about 78.5 wt. % or at least about 79 wt. % at least about 79.5 wt. % or at least about 80.0 wt. % or at least about 80.5 wt. % or at least about 81.0 wt. % or at least about 81.5 wt. % or at least about 82.0 wt. % or even at least about 82.0 wt. %. According to still other embodiments, the high Tg adhesive material may include a high Tg adhesive monomer component A at a concentration of not greater than about 90 wt. % for a total weight of the high Tg adhesive material, such as, not greater than about 89.5 wt. % or not greater than about 89.0 wt. % or not greater than about 88.5 wt. % or not greater than about 88.0 wt. % or not greater than about 87.5 wt. % or not greater than about 87.0 wt. % or not greater than about 86.5 wt. % or not greater than about 86.0 wt. % or not greater than about 85.5 wt. % or not greater than about 85.0 wt. % or not greater than about 84.5 wt. % or even not greater than about 84.0 wt. %. It will be appreciated that the concentration of the high Tg adhesive monomer component A in the high Tg adhesive material may be any value between any of the minimum and maximum values noted above. It will be further appreciated that the concentration of the high Tg adhesive monomer component A in the high Tg adhesive material may be any value within a range between any of the minimum and maximum values noted above.

According to particular embodiments, the high Tg adhesive monomer component A may include 2-ethylhexl acrylate. According to yet other embodiments, the high Tg adhesive monomer component A may consist of 2-ethylhexl acrylate. According to particular embodiments, the high Tg adhesive monomer component A may include iso octyl acrylate. According to yet other embodiments, the high Tg adhesive monomer component A may consist of iso octyl acrylate. According to particular embodiments, the high Tg adhesive monomer component A may include 2(2-ethoxyethoxy) ethyl acrylate. According to yet other embodiments, the high Tg adhesive monomer component A may consist of 2(2-ethoxyethoxy) ethyl acrylate. According to particular embodiments, the high Tg adhesive monomer component A may include isodecyl acrylate. According to yet other embodiments, the high Tg adhesive monomer component A may consist of isodecyl acrylate. According to particular embodiments, the high Tg adhesive monomer component A may include tridecyl acrylate. According to yet other embodiments, the high Tg adhesive monomer component A may consist of tridecyl acrylate.

According to still other embodiments, the high Tg adhesive material may include a high Tg adhesive monomer component B at a particular concentration. For example, the high Tg adhesive material may include a high Tg adhesive monomer component B at a concentration of at least about 7.0 wt. % for a total weight of the high Tg adhesive material, such as, at least about 7.5 wt. % or at least about 8.0 wt. % or at least about 8.5 wt. % or at least about 9.0 wt. % or at least about 9.5 wt. % or at least about 10.0 wt. %. According to still other embodiments, the high Tg adhesive material may include a high Tg adhesive monomer component B at a concentration of not greater than about 15 wt. % for a total weight of the high Tg adhesive material, such as, not greater than about 14.75 wt. % or not greater than about 14.5 wt. % or not greater than about 14.25 wt. % or not greater than about 14 wt. % or not greater than about 13.75 wt. % or not greater than about 13.5 wt. % or not greater than about 13 wt. % or not greater than about 12.75 wt. % or not greater than about 12.5 wt. % or not greater than about 12.25 wt. % or not greater than about 12.0 wt. %. It will be appreciated that the concentration of the high Tg adhesive monomer component B in the high Tg adhesive material may be any value between any of the minimum and maximum values noted above. It will be further appreciated that the concentration of the high Tg adhesive monomer component B in the high Tg adhesive material may be any value within a range between any of the minimum and maximum values noted above.

According to particular embodiments, the high Tg adhesive monomer component B may include isobornyylacrylate. According to yet other embodiments, the high Tg adhesive monomer component B may consist of isobornyylacrylate. According to particular embodiments, the high Tg adhesive monomer component B may include acrylic acid. According to yet other embodiments, the high Tg adhesive monomer component B may consist of acrylic acid. According to particular embodiments, the high Tg adhesive monomer component B may include acryloly morpholine. According to yet other embodiments, the high Tg adhesive monomer component B may consist of acryloly morpholine. According to particular embodiments, the high Tg adhesive monomer component B may include methacrylic acid. According to yet other embodiments, the high Tg adhesive monomer component B may consist of methacrylic acid.

According to still other embodiments, the high Tg adhesive material may include a high Tg adhesive monomer component C at a particular concentration. For example, the high Tg adhesive material may include a high Tg adhesive monomer component C at a concentration of at least about 5.0 wt. % for a total weight of the high Tg adhesive material, such as, at least about 5.1 wt. % or at least about 5.2 wt. % or at least about 5.3 wt. % or at least about 5.4 wt. % or at least about 5.5 wt. %. According to still other embodiments, the high Tg adhesive material may include a high Tg adhesive monomer component C at a concentration of not greater than about 10.0 wt. % for a total weight of the high Tg adhesive material, such as, not greater than about 9.9 wt. % or not greater than about 9.8 wt. % or not greater than about 9.7 wt. % or not greater than about 9.6 wt. % or not greater than about 9.5 wt. % or not greater than about 9.4 wt. % or not greater than about 9.3 wt. % or not greater than about 9.2 wt. % or not greater than about 9.1 wt. % or not greater than about 9.0 wt. % or not greater than about 8.9 wt. % or not greater than about 8.8 wt. % or not greater than about 8.7 wt. % or not greater than about 8.6 wt. % or not greater than about 8.5 wt. % or not greater than about 8.4 wt. % or not greater than about 8.3 wt. % or not greater than about 8.2 wt. % or not greater than about 8.1 wt. % or not greater than about 8.0 wt. % or not greater than about 7.9 wt. % or not greater than about 7.8 wt. % or not greater than about 7.7 wt. % or not greater than about 7.6 wt. % or not greater than about 7.5 wt. % or not greater than about 7.4 wt. % or not greater than about 7.3 wt. % or not greater than about 7.2 wt. % or not greater than about 7.1 wt. % or not greater than about 7.0 wt. % or not greater than about 6.9 wt. % or not greater than about 6.8 wt. % or not greater than about 6.7 wt. % or not greater than about 6.5 wt. % or not greater than about 6.4 wt. % or not greater than about 6.3 wt. % or not greater than about 6.2 wt. % or not greater than about 6.1 wt. % or not greater than about 6.0 wt. %. It will be appreciated that the concentration of the high Tg adhesive monomer component C in the high Tg adhesive material may be any value between any of the minimum and maximum values noted above. It will be further appreciated that the concentration of the high Tg adhesive monomer component C in the high Tg adhesive material may be any value within a range between any of the minimum and maximum values noted above.

According to particular embodiments, the high Tg adhesive monomer component C may include isobornyylacrylate. According to yet other embodiments, the high Tg adhesive monomer component C may consist of isobornyylacrylate. According to particular embodiments, the high Tg adhesive monomer component C may include acrylic acid. According to yet other embodiments, the high Tg adhesive monomer component C may consist of acrylic acid. According to particular embodiments, the high Tg adhesive monomer component C may include acryloly morpholine. According to yet other embodiments, the high Tg adhesive monomer component C may consist of acryloly morpholine. According to particular embodiments, the high Tg adhesive monomer component C may include methacrylic acid. According to yet other embodiments, the high Tg adhesive monomer component C may consist of methacrylic acid.

According to still other embodiments, the high Tg adhesive material may include difunctional acrylate at a particular concentration. For example, the high Tg adhesive material may include difunctional acrylate at a concentration of at least about 0.2 wt. % for a total weight of the high Tg adhesive material, such as, at least about 0.25 wt. % or at least about 0.3 wt. % or at least about 0.35 wt. % or at least about 0.4 wt. %. It will be appreciated that the concentration of difunctional acrylate in the high Tg adhesive material may be any value between any of the values noted above. It will be further appreciated that the concentration of difunctional acrylate in the high Tg adhesive material may be any value within a range between any of the values noted above.

According to still other embodiments, the low Tg adhesive material may include a low Tg adhesive monomer component A at a particular concentration. For example, the low Tg adhesive material may include a low Tg adhesive monomer component A at a concentration of at least about 88.0 wt. % for a total weight of the low Tg adhesive material, such as, at least about 88.1 wt. % or at least about 88.2 wt. % or at least about 88.3 wt. % or at least about 88.4 wt. % or at least about 88.5 wt. % or at least about 88.6 wt. % or at least about 88.7 wt. % or at least about 88.8 wt. % or at least about 88.9 wt. % or at least about 89.0 wt. % or at least about 89.1 wt. % or at least about 89.2 wt. % or at least about 89.3 wt. % or at least about 89.4 wt. % or at least about 89.5 wt. % or at least about 89.6 wt. % or even at least about 89.7 wt. % or even at least about 89.8 wt. % or even at least about 89.9 wt. % or even at least about 90.0 wt. % or even at least about 90.1 wt. % or even at least about 90.2 wt. % or even at least about 90.3 wt. % or even at least about 90.4 wt. % or even at least about 90.5 wt. % or even at least about 90.6 wt. % or even at least about 90.7 wt. % or even at least about 90.8 wt. % or even at least about 90.9 wt. % or even at least about 91.0 wt. %. According to still other embodiments, the low Tg adhesive material may include a low Tg adhesive monomer component A at a concentration of not greater than about 93.0 wt. % for a total weight of the low Tg adhesive material, such as, not greater than about 92.9 wt. % or not greater than about 92.8 wt. % or not greater than about 92.7 wt. % or not greater than about 92.6 wt. % or not greater than about 92.5 wt. % or not greater than about 92.4 wt. % or not greater than about 92.3 wt. % or not greater than about 92.2 wt. % or not greater than about 92.1 wt. % or not greater than about 92.0 wt. %. It will be appreciated that the concentration of the low Tg adhesive monomer component A in the low Tg adhesive material may be any value between any of the minimum and maximum values noted above. It will be further appreciated that the concentration of the low Tg adhesive monomer component A in the low Tg adhesive material may be any value within a range between any of the minimum and maximum values noted above.

According to particular embodiments, the low Tg adhesive monomer component A may include 2-ethylhexl acrylate. According to yet other embodiments, the low Tg adhesive monomer component A may consist of 2-ethylhexl acrylate. According to particular embodiments, the low Tg adhesive monomer component A may include iso octyl acrylate. According to yet other embodiments, the low Tg adhesive monomer component A may consist of iso octyl acrylate. According to particular embodiments, the low Tg adhesive monomer component A may include 2(2-ethoxyethoxy) ethyl acrylate. According to yet other embodiments, the low Tg adhesive monomer component A may consist of 2(2-ethoxyethoxy) ethyl acrylate. According to particular embodiments, the low Tg adhesive monomer component A may include isodecyl acrylate. According to yet other embodiments, the low Tg adhesive monomer component A may consist of isodecyl acrylate. According to particular embodiments, the low Tg adhesive monomer component A may include tridecyl acrylate. According to yet other embodiments, the low Tg adhesive monomer component A may consist of tridecyl acrylate.

According to still other embodiments, the low Tg adhesive material may include a low Tg adhesive monomer component B at a particular concentration. For example, the low Tg adhesive material may include a low Tg adhesive monomer component B at a concentration of at least about 3.5 wt. % for a total weight of the low Tg adhesive material, such as, at least about 3.6 wt. % or at least about 3.7 wt. % or at least about 3.8 wt. % or at least about 3.9 wt. % or at least about 4.0 wt. % or at least about 4.1 wt. % or at least about 4.2 wt. % or at least about 4.3 wt. % or at least about 4.4 wt. % or at least about 4.5 wt. %. According to still other embodiments, the low Tg adhesive material may include a low Tg adhesive monomer component B at a concentration of not greater than about 7.0 wt. % for a total weight of the low Tg adhesive material, such as, not greater than about 6.9 wt. % or not greater than about 6.8 wt. % or not greater than about 6.7 wt. % or not greater than about 6.6 wt. % or not greater than about 6.5 wt. % or not greater than about 6.4 wt. % or not greater than about 6.3 wt. % or not greater than about 6.2 wt. % or not greater than about 6.1 wt. % or not greater than about 6.0 wt. % or not greater than about 5.9 wt. % or not greater than about 5.8 wt. % or not greater than about 5.7 wt. % or not greater than about 5.6 wt. % or not greater than about 5.5 wt. % or not greater than about 5.4 wt. % or not greater than about 5.3 wt. % or not greater than about 5.2 wt. % or not greater than about 5.1 wt. % or not greater than about 5.0 wt. %. It will be appreciated that the concentration of the low Tg adhesive monomer component B in the low Tg adhesive material may be any value between any of the minimum and maximum values noted above. It will be further appreciated that the concentration of the low Tg adhesive monomer component B in the low Tg adhesive material may be any value within a range between any of the minimum and maximum values noted above.

According to particular embodiments, the low Tg adhesive monomer component B may include isobornyylacrylate. According to yet other embodiments, the low Tg adhesive monomer component B may consist of isobornyylacrylate. According to particular embodiments, the low Tg adhesive monomer component B may include acrylic acid. According to yet other embodiments, the low Tg adhesive monomer component B may consist of acrylic acid. According to particular embodiments, the low Tg adhesive monomer component B may include acryloly morpholine. According to yet other embodiments, the low Tg adhesive monomer component B may consist of acryloly morpholine. According to particular embodiments, the low Tg adhesive monomer component B may include methacrylic acid. According to yet other embodiments, the low Tg adhesive monomer component B may consist of methacrylic acid.

According to still other embodiments, the low Tg adhesive material may include a low Tg adhesive monomer component C at a particular concentration. For example, the low Tg adhesive material may include a low Tg adhesive monomer component C at a concentration of at least about 3.0 wt. % for a total weight of the low Tg adhesive material, such as, at least about 3.25 wt. % or at least about 3.5 wt. % or at least about 3.75 wt. % or at least about 4.0 wt. %. According to still other embodiments, the low Tg adhesive material may include a low Tg adhesive monomer component C at a concentration of not greater than about 6.0 wt. % for a total weight of the low Tg adhesive material, such as, not greater than about 5.75 wt. % or not greater than about 5.5 wt. % or not greater than about 5.25 wt. % or not greater than about 5.0 wt. % or not greater than about 4.75 wt. % or not greater than about 4.5 wt. %. It will be appreciated that the concentration of a low Tg adhesive monomer component C in the low Tg adhesive material may be any value between any of the minimum and maximum values noted above. It will be further appreciated that the concentration of a low Tg adhesive monomer component C in the low Tg adhesive material may be any value within a range between any of the minimum and maximum values noted above.

According to particular embodiments, the low Tg adhesive monomer component C may include isobornyylacrylate. According to yet other embodiments, the low Tg adhesive monomer component C may consist of isobornyylacrylate. According to particular embodiments, the low Tg adhesive monomer component C may include acrylic acid. According to yet other embodiments, the low Tg adhesive monomer component C may consist of acrylic acid. According to particular embodiments, the low Tg adhesive monomer component C may include acryloly morpholine. According to yet other embodiments, the low Tg adhesive monomer component C may consist of acryloly morpholine. According to particular embodiments, the low Tg adhesive monomer component C may include methacrylic acid. According to yet other embodiments, the low Tg adhesive monomer component C may consist of methacrylic acid.

According to still other embodiments, the low Tg adhesive material may include resin of hydrogen rosin at a particular concentration. For example, the low Tg adhesive material may include resin of hydrogen rosin at a concentration of at least about 3.0 wt. % for a total weight of the low Tg adhesive material, such as, at least about 3.1 wt. % or at least about 3.2 wt. % or at least about 3.3 wt. % or at least about 3.4 wt. % or at least about 3.5 wt. % or at least about 3.6 wt. % or at least about 3.7 wt. % or at least about 3.8 wt. % or at least about 3.9 wt. % or at least about 4.0 wt. % or at least about 4.1 wt. % or at least about 4.2 wt. % or at least about 4.3 wt. % or at least about 4.4 wt. % or at least about 4.5 wt. % or at least about 4.6 wt. % or at least about 4.7 wt. % or at least about 4.8 wt. % or at least about 4.9 wt. % or at least about 5.0 wt. % or at least about 5.1 wt. % or at least about 5.2 wt. % or at least about 5.3 wt. % or at least about 5.4 wt. % or at least about 5.5 wt. %. According to still other embodiments, the low Tg adhesive material may include resin of hydrogen rosin at a concentration of not greater than about 6.0 wt. % for a total weight of the low Tg adhesive material, such as, not greater than about 5.9 wt. % or not greater than about 5.8 wt. % or not greater than about 5.7 wt. % or not greater than about 5.6 wt. %. It will be appreciated that the concentration of resin of hydrogen rosin in the low Tg adhesive material may be any value between any of the minimum and maximum values noted above. It will be further appreciated that the concentration of resin of hydrogen rosin in the low Tg adhesive material may be any value within a range between any of the minimum and maximum values noted above.

According to still other embodiments, the low Tg adhesive material may include resin of hydrogen rosin at a particular concentration. For example, the low Tg adhesive material may include difunctional acrylate at a concentration of at least about 0.1 wt. % for a total weight of the low Tg adhesive material, such as, at least about 0.11 wt. % or at least about 0.12 wt. % or at least about 0.13 wt. % or at least about 0.14 wt. %. According to still other embodiments, the low Tg adhesive material may include difunctional acrylate at a concentration of not greater than about 0.2 wt. % for a total weight of the low Tg adhesive material, such as, not greater than about 0.19 wt. % or not greater than about 0.18 wt. % or not greater than about 0.17 wt. % or not greater than about 0.16 wt. %. It will be appreciated that the concentration of difunctional acrylate in the low Tg adhesive material may be any value between any of the minimum and maximum values noted above. It will be further appreciated that the concentration of difunctional acrylate in the low Tg adhesive material may be any value within a range between any of the minimum and maximum values noted above.

According to certain embodiments, an adhesive composite as described herein can be formed according to particular depositions methods. In general, forming the adhesive composite includes providing a substrate as described herein, providing a high Tg adhesive material as described herein, providing a low Tg adhesive material as described herein, depositing the high Tg adhesive material and the low Tg adhesive material as an adhesive layer overlying the substrate such that the adhesive layer may include at least a first region of the high Tg adhesive material and a second region of the low Tg adhesive material. The first region of the adhesive layer may be co-planar with the second region of the adhesive layer. Further, forming the adhesive composite may include curing the adhesive layer deposited on the substrate.

According to certain embodiments, deposition may include any deposition method that facilitates depositing the adhesive layer according to embodiments described herein. For example, depositing may include coating, physical vapor deposition, sputtering, magnetron sputtering or even three dimensional printing.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. An adhesive composite comprising: a substrate; and an adhesive layer overlying the substrate, wherein the adhesive layer comprises at least a first region of a high Tg adhesive material and a second region of a low Tg adhesive material; wherein the first region of the adhesive layer is co-planar with the second region of the adhesive layer; wherein the high Tg adhesive material comprises a first glass transition temperature Tg1 and the low Tg adhesive material comprises a second glass transition temperature Tg2; and wherein Tg1 is greater than Tg2.

Embodiment 2. An adhesive composite comprising: a substrate; and an adhesive layer overlying the substrate, wherein the adhesive layer comprises at least a first region of a high Tg adhesive material and a second region of a low Tg adhesive material; wherein the first region of the adhesive layer is co-planar with the second region of the adhesive layer; wherein the high Tg adhesive material comprises a complex shear modulus $G^*_{(-20)}1$ as measured at $-20°$ C. and the low Tg adhesive material comprises a complex shear modulus $G^*_{(-20)}2$ as measured at $-20°$ C.; and wherein $G^*_{(-20)}1$ is greater than $G^*_{(-20)}2$.

Embodiment 3. An adhesive composite comprising: a substrate; and an adhesive layer overlying the substrate, wherein the adhesive layer comprises at least a first region of a high Tg adhesive material and a second region of a low Tg adhesive material; wherein the first region of the adhesive layer is co-planar with the second region of the adhesive layer; wherein the high Tg adhesive material comprises a complex shear modulus $G^*_{(60)}1$ as measured at $60°$ C. and the low Tg adhesive material comprises a complex shear modulus $G^*_{(60)}2$ as measured at $60°$ C.; and wherein $G^*_{(60)}1$ is greater than $G^*_{(60)}2$.

Embodiment 4. An adhesive composite comprising: a substrate; and an adhesive layer overlying the substrate, wherein the adhesive layer comprises at least a first region of a high Tg adhesive material and a second region of a low Tg adhesive material; wherein the first region of the adhesive layer is co-planar with the second region of the adhesive layer; wherein the high Tg adhesive material comprises a peel adhesion PA1 and the low Tg adhesive material comprises a peel adhesion PA2; wherein PA1 is less than PA2.

Embodiment 5. An adhesive composite comprising: a substrate; and an adhesive layer overlying the substrate, wherein the adhesive layer comprises at least a first region of a high Tg adhesive material and a second region of a low Tg adhesive material; wherein the first region of the adhesive layer is co-planar with the second region of the adhesive layer; and wherein the high Tg adhesive material comprises a dynamic shear strength DS1 and the low Tg adhesive material comprises a dynamic shear strength DS2; wherein DS1 is greater than DS2.

Embodiment 6. An adhesive composite comprising: a substrate; and an adhesive layer overlying the substrate, wherein the adhesive layer comprises at least a first region of a high Tg adhesive material and a second region of a low Tg adhesive material; wherein the first region of the adhesive layer is co-planar with the second region of the adhesive layer; wherein the high Tg adhesive material comprises: a high Tg adhesive monomer component A at a concentration of at least about 79 wt. % and not greater than about 90 wt. % for a total weight of the high Tg adhesive material; a high Tg adhesive monomer component B at a concentration of at least about 7 wt. % and not greater than about 13 wt. % for a total weight of the high Tg adhesive material; a high Tg adhesive monomer component C at a concentration of at least about 5 wt. % and not greater than about 8 wt. % for a total weight of the high Tg adhesive material; and difunctional acrylate at a concentration of not greater than about 0.2 wt. % for a total weight of the high Tg adhesive material; wherein the low Tg adhesive material comprises: a low Tg adhesive monomer component A at a concentration of at least about 88.0 wt. % and not greater than about 92.0 wt. % for a total weight of the low Tg adhesive material; a low Tg adhesive monomer component B at a concentration of at least about 3.5 wt. % and not greater than about 7 wt. % for a total weight of the low Tg adhesive material; a low Tg adhesive monomer component C at a concentration of at least about 3 wt. % and not greater than about 6 wt. % for a total weight of the low Tg adhesive material; resin of hydrogen rosin at a concentration of at least about 3.0 wt. % and not greater than about 7 wt. % for a total weight of the low Tg adhesive material; and difunctional acrylate at a concentration of at least about 0.1 wt. % and not greater than about 0.2 wt. % for a total weight of the low Tg adhesive material.

Embodiment 7. The adhesive composite of any one of the previous embodiments, wherein the adhesive composite comprises a damping factor of not greater than about 2.4% over a temperature range of between −20° C. and 60° C. as measured according to industrial standard SAE J 3001, not greater than about 2.3% or not greater than about 2.2% or not greater than about 2.1% or not greater than about 2.0%.

Embodiment 8. The adhesive composite of any one of the previous embodiments, wherein Tg1 is at least about 0.5° C. or at least about 0.6° C. or at least about 0.7° C. or at least about 0.8° C. or at least about 0.9° C. or at least about 1.0° C. or at least about 1.1° C. or at least about 1.2° C. or at least about 1.3° C. or at least about 1.4° C. or at least about 1.5° C. or at least about 1.6° C. or at least about 1.7° C. or at least about 1.8° C. or at least about 1.9° C. or at least about 2.0° C. or at least about 2.5° C. or at least about 3.0° C.

Embodiment 9. The adhesive composite of any one of the previous embodiments, wherein Tg1 is not greater than about 8° C. or not greater than about 7.9° C. or not greater than about 7.8° C. or not greater than about 7.7° C. or not greater than about 7.6° C. or not greater than about 7.5° C. or not greater than about 7.4° C. or not greater than about 7.3° C. or not greater than about 7.2° C. or not greater than about 7.1° C. or not greater than about 7.0° C. or not greater than about 6.9° C. or not greater than about 6.8° C. or not greater than about 6.7° C. or not greater than about 6.6° C. or not greater than about 6.5° C. or not greater than about 6.4° C. or not greater than about 6.3° C. or not greater than about 6.2° C. or not greater than about 6.1° C. or not greater than about 6.0° C. or not greater than about 5.5° C. or not greater than about 5.0° C.

Embodiment 10. The adhesive composite of any one of the previous embodiments, wherein Tg2 is at least about −40° C. or at least about −39.5° C. or at least about −39° C. or at least about −38.5° C. or at least about −38° C. or at least about −37.5° C. or at least about −37° C. or at least about −36.5° C. or at least about −36° C.

Embodiment 11. The adhesive composite of any one of the previous embodiments, wherein Tg2 is not greater than about −22° C. or not greater than about −22.5° C. or not greater than about −23° C. or not greater than about −23.5° C. or not greater than about −24° C. or not greater than about −24.5° C. or not greater than about −25° C. or not greater than about −25.5° C. or not greater than about −26° C. or not greater than about −26.5° C. or not greater than about −27° C. or not greater than about −27.5° C. or not greater than about −28° C. or not greater than about −28.5° C. or not greater than about −29° C. or not greater than about −29.5° C. or not greater than about −30° C. or not greater than about −30.5° C. or not greater than about −31° C. or not greater than about −31.5° C. or not greater than about −32° C. or not greater than about −32.5° C. or not greater than about −33° C. or not greater than about −33.5° C. or not greater than about −34° C.

Embodiment 12. The adhesive composite of any one of the previous embodiments, wherein $G^*_{(-20)}1$ is at least about 4.5 MPa or at least about 5.0 MPa or at least about 5.5 MPa or at least about 6.0 MPa or at least about 6.5 MPa or at least about 7 MPa.

Embodiment 13. The adhesive composite of any one of the previous embodiments, wherein $G^*_{(-20)}1$ is not greater than about 10 MPa or not greater than about 9.5 MPa or not greater than about 9.0 MPa or not greater than about 8.5 MPa or not greater than about 8.0 MPa.

Embodiment 14. The adhesive composite of any one of the previous embodiments, wherein $G^*_{(-20)}2$ is at least about 0.2 MPa or at least about 0.25 MPa or at least about 0.3 MPa or at least about 0.35 MPa or at least about 0.4 MPa.

Embodiment 15. The adhesive composite of any one of the previous embodiments, wherein $G^*_{(-20)}2$ is not greater than about 1.5 MPa or not greater than about 1.4 MPa or not greater than about 1.3 MPa or not greater than about 1.2 MPa or not greater than about 1.1 MPa or not greater than about 1.0 MPa or not greater than about 0.9 MPa or not greater than about 0.8 MPa or not greater than about 0.7 MPa or not greater than about 0.6 MPa.

Embodiment 16. The adhesive composite of any one of the previous embodiments, wherein the ratio of $G^*_{(-20)}1$ to $G^*_{(-20)}2$ is at least about 3 or at least about 4 or at least about 5 or at least about 6 or at least about 7 or at least about 8 or at least about 9 or at least about 10 or at least about 11 or at least about 12 or at least about 12.

Embodiment 17. The adhesive composite of any one of the previous embodiments, wherein the ratio of $G^*_{(-20)}1$ to $G^*_{(-20)}2$ is not greater than about 50 or not greater than about 48 or not greater than about 45 or not greater than about 43 or not greater than about 40 or not greater than about 38 or not greater than about 35 or not greater than about 33 or not greater than about 30 or not greater than about 29 or not greater than about 28 or not greater than about 27 or not greater than about 26 or not greater than about 25 or not greater than about 24 or not greater than about 23 or not greater than about 22 or not greater than about 21 or not greater than about 20.

Embodiment 18. The adhesive composite of any one of the previous embodiments, wherein $G^*_{(60)}1$ is at least about 0.01 MPa or at least about 0.011 MPa or at least about 0.012 MPa or at least about 0.013 MPa or at least about 0.014 MPa or at least about 0.015 MPa or at least about 0.016 MPa or at least about 0.017 MPa or at least about 0.018 MPa or at least about 0.019 MPa or at least about 0.02 MPa.

Embodiment 19. The adhesive composite of any one of the previous embodiments, wherein $G^*_{(60)}1$ is not greater than about 0.045 MPa or not greater than about 0.04 MPa or not greater than about 0.035 MPa or not greater than about 0.03 MPa or not greater than about 0.025 MPa.

Embodiment 20. The adhesive composite of any one of the previous embodiments, wherein $G^*_{(60)}2$ is at least about 0.007 MPa or at least about 0.0075 MPa or at least about 0.008 MPa or at least about 0.0085 MPa or at least about 0.009 MPa.

Embodiment 21. The adhesive composite of any one of the previous embodiments, wherein $G^*_{(60)}2$ is not greater than about 0.025 MPa or not greater than about 0.023 MPa or not greater than about 0.020 MPa or not greater than about 0.018 MPa or not greater than about 0.015 MPa or not greater than about 0.013 MPa or not greater than about 0.01 MPa.

Embodiment 22. The adhesive composite of any one of the previous embodiments, wherein the ratio of $G^*_{(60)}1$ to $G^*_{(60)}2$ is at least about 0.4 or at least about 0.5 or at least about 0.6 or at least about 0.7 or at least about 0.8 or at least about 0.9 or at least about 1.0 or at least about 1.1 or at least about 1.2 or at least about 1.3 or at least about 1.4 or at least about 1.5 or at least about 1.6 or at least about 1.7 or at least about 1.8 or at least about 1.9 or at least about 2.0.

Embodiment 23. The adhesive composite of any one of the previous embodiments, wherein the ratio of $G^*(60>1$ to $G^*_{(60)}2$ is not greater than about 6.4 or not greater than about 6.2 or not greater than about 6.0 or not greater than about 5.8 or not greater than about 5.6 or not greater than about 5.4 or not greater than about 5.2 or not greater than about 5.0 or not greater than about 4.8 or not greater than about 4.6 or not greater than about 4.4 or not greater than about 4.2 or not greater than about 4.0 or not greater than about 3.8 or not greater than about 3.6 or not greater than about 3.4 or not greater than about 3.2 or not greater than about 3.0 or not greater than about 2.8.

Embodiment 24. The adhesive composite of any one of the previous embodiments, wherein the first adhesive comprises a tan $\delta_{(-20)}1$ as measured at −20° C. of at least about 0.42 or at least about 0.43 or at least about 0.44 or at least about 0.45 or at least about 0.46.

Embodiment 25. The adhesive composite of any one of the previous embodiments, wherein the first adhesive comprises a tan $\delta_{(-20)}1$ as measured at −20° C. of not greater than about 0.52 or not greater than about 0.51 or not greater than about 0.50 or not greater than about 0.49 or not greater than about 0.48.

Embodiment 26. The adhesive composite of any one of the previous embodiments, wherein the first adhesive comprises a tan $\delta_{(-20)}2$ as measured at −20° C. of at least about 1.10 or at least about 1.11 or at least about 1.12 or at least about 1.13.

Embodiment 27. The adhesive composite of any one of the previous embodiments, wherein the first adhesive comprises a tan $\delta_{(-20)}2$ as measured at −20° C. of not greater than about 1.31 or not greater than about 1.30 or not greater than about 1.29 or not greater than about 1.28 or not greater than about 1.27 or not greater than about 1.26 or not greater than about 1.25 or not greater than about 1.24 or not greater than about 1.23 or not greater than about 1.21 or not greater than about 1.20 or not greater than about 1.19 or not greater than about 1.18 or not greater than about 1.17 or not greater than about 1.16 or not greater than about 1.15 or not greater than about 1.14.

Embodiment 28. The adhesive composite of any one of the previous embodiments, wherein the first adhesive comprises a tan $\delta_{(-20)}$ combo value C-tan $\delta_{(-20)}$ of at least about 0.75, where C-tan $\delta_{(-20)}=(\tan \delta_{(-20)}1+\tan \delta_{(-20)}2)/2$, or at least about 0.76 or at least about 0.77 or at least about 0.78.

Embodiment 29. The adhesive composite of any one of the previous embodiments, wherein the first adhesive comprises a tan $\delta_{(-20)}$ combo value C-tan $\delta_{(-20)}$ of not greater than about 0.92, where C-tan $\delta_{(-20))}=(\tan \delta_{(-20)}1+\tan \delta_{(-20)}2)/2$, or not greater than about 0.91 or not greater than about 0.91 or not greater than about 0.90 or not greater than about 89 or not greater than about 0.88 or not greater than about 0.87 or not greater than about 0.86 or not greater than about 0.85 or not greater than about 0.84 or not greater than about 0.83 or not greater than about 0.82 or not greater than about 0.81.

Embodiment 30. The adhesive composite of any one of the previous embodiments, wherein the first adhesive comprises a tan $\delta_{(20)}1$ as measured at 20° C. of at least about 0.85 or at least about 0.86 or at least about 0.87 or at least about 0.88 or at least about 0.89 or at least about 0.90 or at least about 0.91 or at least about 0.92 or at least about 0.93 or at least about 0.94.

Embodiment 31. The adhesive composite of any one of the previous embodiments, wherein the first adhesive comprises a tan $\delta_{(20)}1$ as measured at 20° C. of not greater than about 0.99 or not greater than about 0.98 or not greater than about 0.97 or not greater than about 0.96.

Embodiment 32. The adhesive composite of any one of the previous embodiments, wherein the first adhesive comprises a tan $\delta_{(20)}2$ as measured at 20° C. of at least about 0.71 or at least about 0.715 or at least about 0.72.

Embodiment 33. The adhesive composite of any one of the previous embodiments, wherein the first adhesive comprises a tan $\delta_{(20)}2$ as measured at 20° C. of not greater than about 0.87 or not greater than about 0.86 or not greater than about 0.85 or not greater than about 0.84 or not greater than about 0.83 or not greater than about 0.82 or not greater than about 0.81 or not greater than about 0.80 or not greater than about 0.79 or not greater than about 0.78 or not greater than about 0.76 or not greater than about 0.75 or not greater than about 0.74.

Embodiment 34. The adhesive composite of any one of the previous embodiments, wherein the first adhesive comprises a tan $\delta_{(20)}$ combo value C-tan $\delta_{(20)}$ of at least about 0.78, where C-tan $\delta_{(20)}=(\tan \delta_{(20)}1+\tan \delta_{(20)}2)/2$, or at least about 0.79 or at least about 0.80 or at least about 0.81 or at least about 0.82 or at least about 0.83.

Embodiment 35. The adhesive composite of any one of the previous embodiments, wherein the first adhesive comprises a tan $\delta_{(20)}$ combo value C-tan $\delta_{(20)}$ of not greater than about 0.93, where C-tan $\delta_{(20)}=(\tan \delta_{(20)}1+\tan \delta_{(20)}2)/2$, or not greater than about 0.92 or not greater than about 0.91 or not greater than about 0.90 or not greater than about 89 or not greater than about 0.88 or not greater than about 0.87 or not greater than about 0.86 or not greater than about 0.85.

Embodiment 36. The adhesive composite of any one of the previous embodiments, wherein the first adhesive comprises a tan $\delta_{(60)}1$ as measured at 60° C. of at least about 0.3 or at least about 0.33 or at least about 0.35 or at least about 0.38 or at least about 0.40 or at least about 0.41 or at least about 0.42.

Embodiment 37. The adhesive composite of any one of the previous embodiments, wherein the first adhesive comprises a tan $\delta_{(60)}1$ as measured at 60° C. of not greater than about 0.46 or not greater than about 0.45 or not greater than about 0.44 or not greater than about 0.43.

Embodiment 38. The adhesive composite of any one of the previous embodiments, wherein the first adhesive comprises a tan $\delta_{(60)}2$ as measured at 60° C. of at least about 0.54 or at least about 0.55 or at least about 0.56 or at least about 0.57 or at least about 0.58 or at least about 0.59 or at least about 0.6.

Embodiment 39. The adhesive composite of any one of the previous embodiments, wherein the first adhesive comprises a tan $\delta_{(60)}2$ as measured at 60° C. of not greater than about 0.87 or not greater than about 0.85 or not greater than about 0.82 or not greater than about 0.80 or not greater than about 0.77 or not greater than about 0.75 or not greater than about 0.72 or not greater than about 0.70 or not greater than about 0.67 or not greater than about 0.65 or not greater than about 0.63.

Embodiment 40. The adhesive composite of any one of the previous embodiments, wherein the first adhesive comprises a tan $\delta_{(60)}$ combo value C-tan $\delta_{(60)}$ of at least about 0.42, where C-tan $\delta_{(60)}=(\tan \delta_{(60)}1+\tan \delta_{(60)}2)/2$, or at least about 0.43 or at least about 0.44 or at least about 0.45 or at least about 0.46 or at least about 0.47 or at least about 0.48 or at least about 0.49 or at least about 0.50 or at least about 0.51.

Embodiment 41. The adhesive composite of any one of the previous embodiments, wherein the first adhesive comprises a tan $\delta_{(60)}$ combo value C-tan $\delta_{(60)}$ of not greater than about 0.66, where C-tan $\delta_{(60)}=(\tan \delta_{(60)}1+\tan \delta_{(60)}2)/2$, or not greater than about 0.65 or not greater than about 0.64 or not greater than about 0.63 or not greater than about 0.62 or not greater than about 0.61 or not greater than about 0.60 or not greater than about 0.59 or not greater than about 0.58 or not greater than about 0.57 or not greater than about 0.56 or not greater than about 0.55 or not greater than about 0.54 or not greater than about 0.53.

Embodiment 42. The adhesive composite of any one of the previous embodiments, wherein the first adhesive comprises a stainless steel peel strength $SS_{PS1}$ of at least about 8.4 N/cm or at least about 8.5 N/cm or at least about 8.6 N/cm or at least about 8.7 N/cm or at least about 8.8 N/cm or at least about 8.9 N/cm or at least about 9.0 N/cm or at least about 9.1 N/cm or at least about 9.2 N/cm or at least about 9.3 N/cm or at least about 9.4 N/cm or at least about 9.5 N/cm or at least about 9.6 N/cm or at least about 9.7 N/cm or at least about 9.8 N/cm or at least about 9.9 N/cm or at least about 10.0 N/cm.

Embodiment 43. The adhesive composite of any one of the previous embodiments, wherein the first adhesive comprises a stainless steel peel strength $SS_{PS1}$ of not greater than about 12 N/cm or not greater than about 11.9 N/cm or not greater than about 11.8 N/cm or not greater than about 11.7 N/cm or not greater than about 11.6 N/cm or not greater than about 11.5 N/cm or not greater than about 11.4 N/cm or not greater than about 11.3 N/cm or not greater than about 11.2 N/cm or not greater than about 11.1 N/cm or not greater than about 11.0 N/cm or not greater than about 10.9 N/cm or not greater than about 10.8 N/cm or not greater than about 10.7 N/cm or not greater than about 10.6 N/cm or not greater than about 10.5 N/cm.

Embodiment 44. The adhesive composite of any one of the previous embodiments, wherein the second adhesive comprises a stainless steel peel strength $SS_{PS2}$ of at least about 7.6 N/cm or at least about 7.7 N/cm or at least about 7.8 N/cm or at least about 7.9 N/cm or at least about 8.0 N/cm or at least about 8.1 N/cm or at least about 8.2 N/cm or at least about 8.3 N/cm or at least about 8.4 N/cm or at least about 8.5 N/cm.

Embodiment 45. The adhesive composite of any one of the previous embodiments, wherein the second adhesive comprises a stainless steel peel strength $SS_{PS2}$ of not greater than about 9.6 N/cm or not greater than about 9.5 N/cm or not greater than about 9.4 N/cm or not greater than about 9.3 N/cm or not greater than about 9.2 N/cm or not greater than about 9.1 N/cm or not greater than about 9.0 N/cm.

Embodiment 46. The adhesive composite of any one of the previous embodiments, wherein the first adhesive comprises a MSE peel strength $MSE_{PS1}$ of at least about 6.4 N/cm or at least about 6.5 N/cm or at least about 6.6 N/cm or at least about 6.7 N/cm or at least about 6.8 N/cm or at least about 6.9 N/cm or at least about 7.0 N/cm.

Embodiment 47. The adhesive composite of any one of the previous embodiments, wherein the first adhesive comprises a MSE peel strength $MSE_{psi}$ of not greater than about 8.8 N/cm or not greater than about 8.7 N/cm or not greater than about 8.6 N/cm or not greater than about 8.5 N/cm or not greater than about 8.4 N/cm or not greater than about 8.3 N/cm or not greater than about 8.2 N/cm or not greater than about 8.1 N/cm or not greater than about 8.0 N/cm or not greater than about 7.9 N/cm or not greater than about 7.8 N/cm or not greater than about 7.7 N/cm or not greater than about 7.6 N/cm or not greater than about 7.5 N/cm.

Embodiment 48. The adhesive composite of any one of the previous embodiments, wherein the second adhesive comprises a MSE peel strength $MSE_{PS2}$ of at least about 7.6 N/cm or at least about 7.7 N/cm or at least about 7.8 N/cm or at least about 7.9 N/cm or at least about 8.0 N/cm.

Embodiment 49. The adhesive composite of any one of the previous embodiments, wherein the second adhesive comprises a MSE peel strength $MSE_{PS2}$ of not greater than about 8.8 N/cm or not greater than about 8.7 N/cm or not greater than about 8.6 N/cm or not greater than about 8.5 N/cm or not greater than about 8.4 N/cm or not greater than about 8.3 N/cm or not greater than about 8.2 N/cm.

Embodiment 50. The adhesive composite of any one of the previous embodiments, wherein the first region comprises a plurality of zones of the high Tg adhesive material; wherein the second region comprises a plurality of zones of the low Tg adhesive material.

Embodiment 51. The adhesive composite of embodiment 50, wherein plurality of zones of the high Tg adhesive material and the plurality of zones of the low Tg adhesive material are arranged on the substrate in a repeating pattern.

Embodiment 52. The adhesive composite of embodiment 50, wherein each zone of the high Tg adhesive material is substantially contiguous with a zone of the low Tg adhesive material.

Embodiment 53. The adhesive composite of embodiment 51, wherein a portion of the substrate covered by the high Tg adhesive material is equal to a portion of the substrate covered by the low Tg adhesive material.

Embodiment 54. The adhesive composite of embodiment 51, wherein the repeating pattern of the plurality of zones of the high Tg adhesive material and the plurality of zones of the low Tg adhesive material is a checkered pattern of alternating squares of the high Tg adhesive material and the low Tg adhesive material.

Embodiment 55. The adhesive composite of embodiment 51, wherein the repeating pattern of the plurality of zones of the high Tg adhesive material and the plurality of zones of the low Tg adhesive material is a pattern of alternating dots of the high Tg adhesive material and the low Tg adhesive material.

Embodiment 56. The adhesive composite of embodiment 51, wherein the repeating pattern of the plurality of zones of the high Tg adhesive material and the plurality of zones of the low Tg adhesive material is a pattern of alternating strips of the high Tg adhesive material and the low Tg adhesive material.

Embodiment 57. The adhesive composite of embodiment 56, wherein the alternating strips of the high Tg adhesive material and the low Tg adhesive material have substantially the same width.

Embodiment 58. The adhesive composite of any one of the previous embodiments, wherein each of the alternating strips are parallel with each other.

Embodiment 59. The adhesive composite of any one of the previous embodiments, wherein each of the alternating strips have a width of at least about 3 mm or at least about 3.1 mm or at least about 3.2 mm or at least about 3.3 mm or at least about 3.4 mm or at least about 3.5 mm or at least about 3.6 mm or at least about 3.7 mm or at least about 3.8 mm or at least about 4.0 mm.

Embodiment 60. The adhesive composite of any one of the previous embodiments, wherein each of the alternating strips have a width of not greater than about 7 mm or not greater than about 6.9 mm or not greater than about 6.8 mm or not greater than about 6.7 mm or not greater than about 6.6 mm or not greater than about 6.5 mm or not greater than about 6.4 mm or not greater than about 6.3 mm or not greater than about 6.2 mm or not greater than about 6.1 mm or not greater than about 6.0 mm or not greater than about 5.9 mm or not greater than about 5.8 mm or not greater than about 5.7 mm or not greater than about 5.6 mm or not greater than about 5.5 mm.

EXAMPLES

The concepts described herein will be further described in the following Examples, which do not limit the scope of the invention described in the claims.

Example 1

A first sample composite S1 was formed by depositing a high Tg adhesive material and a low Tg adhesive material in a pattern of alternating stipes on a substrate. Deposition of the sample composite was carried out using a coating process with a comb blade deposition head. The composition of the high Tg adhesive material and the composition of the low Tg adhesive material are provided in Table 1 below.

TABLE 1

| High Tg Adhesive Material Composition | | | Low Tg Adhesive Material | | |
|---|---|---|---|---|---|
| Raw Material (wt. % of total raw material) | 2-EHA | 83.95 | Raw Material (wt. % of total raw material) | 2-EHA | 88.95 |
| | IBOA | 10.0 | | IBOA | 5.0 |
| | Acrylic Acid | 6.0 | | Acrylic Acid | 6.0 |
| | Irgacure 2022 | 0.05 | | Irgacure 2022 | 0.05 |
| Syrup Mixture (wt. % of total syrup mixture) | Raw Polymer | 94.10 | Syrup Mixture (wt. % of total syrup mixture) | Raw Polymer | 93.3 |
| | 2-EHA | 0.90 | | HDDA | 0.1 |
| | HDDA | 0.10 | | Foral 85 E | 6.0 |
| | Cymel 303 | 0.30 | | Irgacure 2100 | 0.6 |
| | Acrylic Acid | 4.00 | | | |
| | Irgacure 651 | 0.60 | | | |

Measured characteristics of the high Tg adhesive material and the low Tg adhesive material are provided in Table 2 below.

TABLE 2

| High Tg Adhesive Material Composition | | Low Tg Adhesive Material Composition | |
|---|---|---|---|
| Tg | 4.5° C. | Tg | −35° C. |
| G* @ −20° C. | 7.1 MPa | G* @ −20° C. | 0.55 MPa |
| G* @ 20° C. | 0.098 MPa | G* @ 20° C. | 0.028 MPa |
| G* @ 60° C. | 0.02 MPa | G* @ 60° C. | 0.011 MPa |
| tanδ @ −20° C. | 0.47 | tanδ @ −20° C. | 1.16 |
| tanδ @ 20° C. | 0.95 | tanδ @ 20° C. | 0.73 |
| tanδ @ 60° C. | 0.42 | tanδ @ 60° C. | 0.91 |
| Peel Steel | 10.4 N/cm | Peel Steel | 8.8 N/cm |
| Peel PVC | 7.2 N/cm | Peel PVC | 9.7 N/cm |
| Dynamic Shear | 1.35 MPa | | |

The raw material compositions for each adhesive material were combined using UV initiated prepolymerisation. The polymerized raw material mixtures were then added to the additional components to form the syrup. After coating of the adhesive materials onto the substrate to form the adhesive layer of the composite, the adhesive composite was cured by UV-light in a coating line and wound on roll.

Measured characteristics of the sample composite S1 provided in Table 3 below.

TABLE 3

| Sample Composite S1 | |
|---|---|
| G*(High Tg)/G*(Low Tg) (−20° C.) | 12.9 |
| G*(High Tg)/G*(Low Tg) (20° C.) | 3.5 |
| G*(High Tg)/G*(Low Tg) (60° C.) | 1.8 |
| (tanδ (low Tg) + tanδ (high Tg))/2) (−20° C.) | 0.82 |
| (tanδ (low Tg) + tanδ (high Tg))/2) (20° C.) | 0.84 |
| (tanδ (low Tg) + tanδ (high Tg))/2)) (60° C.) | 0.67 |

Example 2

A second sample composite S2 was formed by depositing a high Tg adhesive material and a low Tg adhesive material in a pattern of alternating stipes on a substrate. Deposition of the sample composite was carried out using a coating process with a comb blade deposition head. The composition of the high Tg adhesive material and the composition of the low Tg adhesive material are provided in Table 4 below.

TABLE 4

| High Tg Adhesive Material Composition | | | Low Tg Adhesive Material | | |
|---|---|---|---|---|---|
| Raw Material (wt. % of total raw material) | 2-EHA | 83.95 | Raw Material (wt. % of total raw material) | 2-EHA | 89.45 |
| | IBOA | 10.40 | | IBOA | 6.8 |
| | Acrylic Acid | 5.60 | | Acrylic Acid | 3.7 |
| | Irgacure 2022 | 0.05 | | Irgacure 2022 | 0.05 |
| Syrup Mixture (wt. % of total syrup mixture) | Raw Polymer | 94.10 | Syrup Mixture (wt. % of total syrup mixture) | Raw Polymer | 94.9 |
| | 2-EHA | 0.90 | | HDDA | 0.2 |
| | HDDA | 0.10 | | Foral 85 E | 4.3 |
| | Cymel 303 | 0.30 | | Irgacure 2100 | 0.6 |
| | Acrylic Acid | 4.00 | | | |
| | Irgacure 651 | 0.60 | | | |

Measured characteristics of the high Tg adhesive material and the low Tg adhesive material are provided in Table 5 below.

TABLE 5

| High Tg Adhesive Material Composition | | Low Tg Adhesive Material Composition | |
|---|---|---|---|
| Tg | 3° C. | Tg | −36° C. |
| G* @ −20° C. | 6.7 MPa | G* @ −20° C. | 1.0 MPa |
| G* @ 20° C. | 0.085 MPa | G* @ 20° C. | 0.035 MPa |
| G* @ 60° C. | 0.02 MPa | G* @ 60° C. | 0.009 MPa |
| tanδ @ −20° C. | 0.48 | tanδ @ −20° C. | 1.14 |
| tanδ @ 20° C. | 0.93 | tanδ @ 20° C. | 0.7 |
| tanδ @ 60° C. | 0.44 | tanδ @ 60° C. | 0.59 |
| Peel Steel | 10.0 N/cm | Peel Steel | 7.3 N/cm |
| Peel PVC | 6.4 N/cm | Peel PVC | 7.0 N/cm |
| Dynamic Shear | 1.3 MPa | | |

The raw material compositions for each adhesive material were combined using UV initiated prepolymerisation. The polymerized raw material mixtures were then added to the additional components to form the syrup. After coating of the adhesive materials onto the substrate to form the adhesive layer of the composite, the adhesive composite was cured by UV-light in a coating line and wound on roll.

Measured characteristics of the sample composite S1 provided in Table 6 below.

TABLE 6

| Sample Composite S2 | |
|---|---|
| G*(High Tg)/G*(Low Tg) (−20° C.) | 6.7 |
| G*(High Tg)/G*(Low Tg) (20° C.) | 2.43 |
| G*(High Tg)/G*(Low Tg) (60° C.) | 2.2 |
| (tanδ (low Tg) + tanδ (high Tg))/2) (−20° C.) | 0.81 |
| (tanδ (low Tg) + tanδ (high Tg))/2) (20° C.) | 0.82 |
| (tanδ (low Tg) + tanδ (high Tg))/2)) (60° C.) | 0.52 |

Example 3

A second sample composite S3 was formed by depositing a high Tg adhesive material and a low Tg adhesive material in a pattern of alternating stipes on a substrate. Deposition of the sample composite was carried out using a coating process with a comb blade deposition head. The composition of the high Tg adhesive material and the composition of the low Tg adhesive material are provided in Table 7 below.

TABLE 7

| High Tg Adhesive Material Composition | | | Low Tg Adhesive Material | | |
|---|---|---|---|---|---|
| Raw Material (wt. % of total raw material) | 2-EHA | 82.35 | Raw Material (wt. % of total raw material) | 2-EHA | 91.95 |
| | IBOA | 11.70 | | IBOA | 4.9 |
| | Acrylic Acid | 5.90 | | Acrylic Acid | 3.1 |
| | Irgacure 2022 | 0.05 | | Irgacure 2022 | 0.05 |
| Syrup Mixture (wt. % of total syrup mixture) | Raw Polymer | 94.10 | Syrup Mixture (wt. % of total syrup mixture) | Raw Polymer | 95.21 |
| | 2-EHA | 0.90 | | HDDA | 0.19 |
| | HDDA | 0.10 | | Foral 85 E | 4 |
| | Cymel 303 | 0.30 | | Irgacure 2100 | 0.6 |
| | Acrylic Acid | 4.00 | | | |
| | Irgacure 651 | 0.60 | | | |

Measured characteristics of the high Tg adhesive material and the low Tg adhesive material are provided in Table 8 below.

TABLE 8

| High Tg Adhesive Material Composition | | Low Tg Adhesive Material Composition | |
|---|---|---|---|
| Tg | 5° C. | Tg | −34° C. |
| G* @ −20° C. | 8.7 MPa | G* @ −20° C. | 0.3 MPa |
| G* @ 20° C. | 0.09 MPa | G* @ 20° C. | 0.037 MPa |
| G* @ 60° C. | 0.02 MPa | G* @ 60° C. | 0.011 MPa |
| tanδ @ −20° C. | 0.46 | tanδ @ −20° C. | 1.11 |
| tanδ @ 20° C. | 0.96 | tanδ @ 20° C. | 0.69 |
| tanδ @ 60° C. | 0.44 | tanδ @ 60° C. | 0.57 |
| Peel Steel | 10.0 N/cm | Peel Steel | 7.6 N/cm |
| Peel PVC | 6.8 N/cm | Peel PVC | 8.0 N/cm |
| Dynamic Shear | 1.4 MPa | | |

The raw material compositions for each adhesive material were combined using UV initiated prepolymerisation. The polymerized raw material mixtures were then added to the additional components to form the syrup. After coating of the adhesive materials onto the substrate to form the adhesive layer of the composite, the adhesive composite was cured by UV-light in a coating line and wound on roll.

Measured characteristics of the sample composite S3 provided in Table 9 below.

TABLE 9

| Sample Composite S3 | |
|---|---|
| G*(High Tg)/G*(Low Tg) (−20° C.) | 29.0 |
| G*(High Tg)/G*(Low Tg) (20° C.) | 2.43 |
| G*(High Tg)/G*(Low Tg) (60° C.) | 1.8 |
| (tanδ (low Tg) + tanδ (high Tg))/2) (−20° C.) | 0.79 |
| (tanδ (low Tg) + tanδ (high Tg))/2) (20° C.) | 0.83 |
| (tanδ (low Tg) + tanδ (high Tg))/2)) (60° C.) | 0.51 |

Example 4

A second sample composite S4 was formed by depositing a high Tg adhesive material and a low Tg adhesive material in a pattern of alternating stipes on a substrate. Deposition of the sample composite was carried out using a coating process with a comb blade deposition head. The composition of the high Tg adhesive material and the composition of the low Tg adhesive material are provided in Table 10 below.

TABLE 10

| High Tg Adhesive Material Composition | | | Low Tg Adhesive Material | | |
|---|---|---|---|---|---|
| Raw Material (wt. % of total raw material) | 2-EHA | 87.65 | Raw Material (wt. % of total raw material) | 2-EHA | 92.95 |
| | IBOA | 7 | | IBOA | 3.5 |
| | Acrylic Acid | 5.3 | | Acrylic Acid | 3.5 |
| | Irgacure 2022 | 0.05 | | Irgacure 2022 | 0.05 |
| Syrup Mixture (wt. % of total syrup mixture) | Raw Polymer | 94.10 | Syrup Mixture (wt. % of total syrup mixture) | Raw Polymer | 95.21 |
| | 2-EHA | 0.90 | | HDDA | 0.11 |
| | HDDA | 0.10 | | Foral 85 E | 4.8 |
| | Cymel 303 | 0.30 | | Irgacure 2100 | 0.6 |
| | Acrylic Acid | 4.00 | | | |
| | Irgacure 651 | 0.60 | | | |

Measured characteristics of the high Tg adhesive material and the low Tg adhesive material are provided in Table 11 below.

TABLE 11

| High Tg Adhesive Material Composition | | Low Tg Adhesive Material Composition | |
|---|---|---|---|
| Tg | −0.5° C. | Tg | −40° C. |
| G* @ −20° C. | 5.4 MPa | G* @ −20° C. | 0.25 MPa |
| G* @ 20° C. | 0.085 MPa | G* @ 20° C. | 0.027 MPa |
| G* @ 60° C. | 0.019 MPa | G* @ 60° C. | 0.005 MPa |
| tanδ @ −20° C. | 0.52 | tanδ @ −20° C. | 1.29 |
| tanδ @ 20° C. | 0.85 | tanδ @ 20° C. | 0.72 |
| tanδ @ 60° C. | 0.43 | tanδ @ 60° C. | 0.87 |
| Peel Steel | 10.0 N/cm | Peel Steel | 9.6 N/cm |
| Peel PVC | 7.0 N/cm | Peel PVC | 9.6 N/cm |
| Dynamic Shear | 1.4 MPa | | |

The raw material compositions for each adhesive material were combined using UV initiated prepolymerisation. The polymerized raw material mixtures were then added to the additional components to form the syrup. After coating of the adhesive materials onto the substrate to form the adhesive layer of the composite, the adhesive composite was cured by UV-light in a coating line and wound on roll.

Measured characteristics of the sample composite S4 provided in Table 12 below.

TABLE 12

| Sample Composite S4 | |
|---|---|
| G*(High Tg)/G*(Low Tg) (−20° C.) | 21.6 |
| G*(High Tg)/G*(Low Tg) (20° C.) | 3.14 |
| G*(High Tg)/G*(Low Tg) (60° C.) | 3.8 |
| (tanδ (low Tg) + tanδ (high Tg))/2) (−20° C.) | 0.91 |
| (tanδ (low Tg) + tanδ (high Tg))/2) (20° C.) | 0.79 |
| (tanδ (low Tg) + tanδ (high Tg))/2)) (60° C.) | 0.65 |

Example 5

A second sample composite S5 was formed by depositing a high Tg adhesive material and a low Tg adhesive material in a pattern of alternating stipes on a substrate. Deposition of the sample composite was carried out using a coating process with a comb blade deposition head. The composition of the high Tg adhesive material and the composition of the low Tg adhesive material are provided in Table 13 below.

TABLE 13

| High Tg Adhesive Material Composition | | | Low Tg Adhesive Material | | |
|---|---|---|---|---|---|
| Raw Material (wt. % of total raw material) | 2-EHA | 81.95 | Raw Material (wt. % of total raw material) | 2-EHA | 91.35 |
| | IBOA | 11.1 | | IBOA | 3 |
| | Acrylic Acid | 6.9 | | Acrylic Acid | 5.6 |
| | Irgacure 2022 | 0.05 | | Irgacure 2022 | 0.05 |
| Syrup Mixture (wt. % of total syrup mixture) | Raw Polymer | 94.10 | Syrup Mixture (wt. % of total syrup mixture) | Raw Polymer | 95.21 |
| | 2-EHA | 0.90 | | HDDA | 0.2 |
| | HDDA | 0.10 | | Foral 85 E | 4 |
| | Cymel 303 | 0.30 | | Irgacure 2100 | 0.6 |
| | Acrylic Acid | 4.00 | | | |
| | Irgacure 651 | 0.60 | | | |

Measured characteristics of the high Tg adhesive material and the low Tg adhesive material are provided in Table 14 below.

TABLE 14

| High Tg Adhesive Material Composition | | Low Tg Adhesive Material Composition | |
|---|---|---|---|
| Tg | 7.7° C. | Tg | −29° C. |
| G* @ −20° C. | 10 MPa | G* @ −20° C. | 1.1 MPa |
| G* @ 20° C. | 0.12 MPa | G* @ 20° C. | 0.05 MPa |
| G* @ 60° C. | 0.023 MPa | G* @ 60° C. | 0.012 MPa |
| tanδ @ −20° C. | 0.42 | tanδ @ −20° C. | 1.13 |
| tanδ @ 20° C. | 1.02 | tanδ @ 20° C. | 0.73 |
| tanδ @ 60° C. | 0.44 | tanδ @ 60° C. | 0.54 |
| Peel Steel | 10.8 N/cm | Peel Steel | 9.0 N/cm |
| Peel PVC | 6.7 N/cm | Peel PVC | 8.4 N/cm |
| Dynamic Shear | 1.4 MPa | | |

The raw material compositions for each adhesive material were combined using UV initiated prepolymerisation. The polymerized raw material mixtures were then added to the additional components to form the syrup. After coating of the adhesive materials onto the substrate to form the adhesive layer of the composite, the adhesive composite was cured by UV-light in a coating line and wound on roll.

Measured characteristics of the sample composite S5 provided in Table 15 below.

TABLE 15

| Sample Composite S5 | |
|---|---|
| G*(High Tg)/G*(Low Tg) (−20° C.) | 7.0 |
| G*(High Tg)/G*(Low Tg) (20° C.) | 2.4 |
| G*(High Tg)/G*(Low Tg) (60° C.) | 1.9 |
| (tanδ (low Tg) + tanδ (high Tg))/2) (−20° C.) | 0.78 |
| (tanδ (low Tg) + tanδ (high Tg))/2) (20° C.) | 0.88 |
| (tanδ (low Tg) + tanδ (high Tg))/2)) (60° C.) | 0.49 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An adhesive composite comprising:
    a substrate; and
    an adhesive layer overlying the substrate,
        wherein the adhesive layer comprises at least a first region of a high Tg adhesive material and a second region of a low Tg adhesive material;
        wherein the high Tg adhesive material has a first glass transition temperature Tg1 and the low Tg adhesive material has a second glass transition temperature Tg2, where Tg1 is greater than Tg2;
        wherein the first region of the adhesive layer is co-planar with the second region of the adhesive layer;
        wherein the high Tg adhesive material comprises a complex shear modulus $G^*_{(60)}1$ as measured at 60° C. and the low Tg adhesive material comprises a complex shear modulus $G^*_{(60)}2$ as measured at 60° C.;
        wherein $G^*_{(60)}1$ is greater than $G^*_{(60)}2$;
        wherein $G^*_{(60)}1$ is at least 0.01 MPa and not greater than 0.045 MPa; and
        wherein $G^*_{(60)}2$ is at least 0.007 MPa and not greater than 0.025 MPa.

2. The adhesive composite of claim 1, wherein the adhesive composite comprises a damping factor of not greater than 2.4% over a temperature range of between −20° C. and 60° C. as measured according to industrial standard SAE J 3001.

3. The adhesive composite of claim 1, wherein the adhesive material of the first region of the adhesive layer comprises a stainless steel peel strength $SS_{PS1}$ of at least 8.4 N/cm and not greater than 12 N/cm.

4. The adhesive composite of claim 1, wherein the adhesive material of the second region of the adhesive layer comprises a stainless steel peel strength $SS_{PS2}$ of at least 7.6 N/cm and not greater than 9.6 N/cm.

5. The adhesive composite of claim 1, wherein the first region comprises a plurality of zones of the high Tg adhesive material and wherein the second region comprises a plurality of zones of the low Tg adhesive material.

6. The adhesive composite of claim 5, wherein plurality of zones of the high Tg adhesive material and the plurality of zones of the low Tg adhesive material are arranged on the substrate in a repeating pattern.

7. The adhesive composite of claim 5, wherein each zone of the high Tg adhesive material is contiguous with a zone of the low Tg adhesive material.

8. The adhesive composite of claim 6, wherein a portion of the substrate covered by the high Tg adhesive material is equal to a portion of the substrate covered by the low Tg adhesive material.

9. The adhesive composite of claim 6, wherein the repeating pattern of the plurality of zones of the high Tg adhesive material and the plurality of zones of the low Tg adhesive material is a checkered pattern of alternating squares of the high Tg adhesive material and the low Tg adhesive material.

10. The adhesive composite of claim 6, wherein the repeating pattern of the plurality of zones of the high Tg adhesive material and the plurality of zones of the low Tg adhesive material is a pattern of alternating dots of the high Tg adhesive material and the low Tg adhesive material.

11. The adhesive composite of claim 6, wherein the repeating pattern of the plurality of zones of the high Tg adhesive material and the plurality of zones of the low Tg adhesive material is a pattern of alternating strips of the high Tg adhesive material and the low Tg adhesive material.

12. The adhesive composite of claim 11, wherein each of the alternating strips are parallel with each other.

13. The adhesive composite of claim 12, wherein each of the alternating strips have a width of at least 3 mm and not greater than 7 mm.

* * * * *